(12) United States Patent
Baggs et al.

(10) Patent No.: US 11,105,096 B2
(45) Date of Patent: Aug. 31, 2021

(54) INTEGRATED WATERPROOFING AND DRAINAGE SYSTEM WITH INTRINSIC LEAK DETECTION FOR BUILDING STRUCTURES AND METHODS OF USE

(71) Applicant: BuildTech Solutions LLC, Cheektowaga, NY (US)

(72) Inventors: George S. Baggs, Hamburg, NY (US); Aaron W. Golding, Jr., Derby, NY (US)

(73) Assignee: BuildTech Solutions LLC, Cheektowaga, NY (US)

( * ) Notice: Subject to any disclaimer, the term of this patent is extended or adjusted under 35 U.S.C. 154(b) by 97 days.

(21) Appl. No.: 16/416,233

(22) Filed: May 19, 2019

(65) Prior Publication Data

US 2019/0271157 A1    Sep. 5, 2019

Related U.S. Application Data

(63) Continuation-in-part of application No. 15/709,980, filed on Sep. 20, 2017, now Pat. No. 10,344,470, (Continued)

(51) Int. Cl.
    B65B 1/04    (2006.01)
    E04C 2/52    (2006.01)
    (Continued)

(52) U.S. Cl.
    CPC ............. *E04C 2/528* (2013.01); *B32B 3/02* (2013.01); *B32B 3/266* (2013.01); *B32B 5/022* (2013.01); *B32B 5/26* (2013.01); *B32B 7/06* (2013.01); *B32B 7/08* (2013.01); *B32B 7/14* (2013.01); *B32B 11/06* (2013.01); *B32B 15/085* (2013.01); *B32B 15/18* (2013.01); *B32B 27/12* (2013.01);
    (Continued)

(58) Field of Classification Search
    USPC .................. 324/664, 691, 694; 428/338, 339
    See application file for complete search history.

(56) References Cited

U.S. PATENT DOCUMENTS 3,186,896 A    6/1965   Clem
3,445,322 A    5/1969   Saiia et al.
(Continued)

OTHER PUBLICATIONS

Polyguard's 650 Membrane Product Data Sheet for sheet waterproofing membrane; published prior to Apr. 15, 2015; five pages.
(Continued)

*Primary Examiner* — Vincent Q Nguyen
(74) *Attorney, Agent, or Firm* — Terrence M. Wyles, Esq.; Startup IP Law, LLC

(57) ABSTRACT

The inventive disclosures are directed to an improved waterproofing membrane that features a polymer backing membrane with an integrated electrically-conductive layer that is used to create improved asphaltic waterproofing membranes and sodium-bentonite-clay waterproofing panels with intrinsic leak-detection capability for applications in below-grade waterproofing systems and above-grade air-barrier systems and horizontal roofing and deck-coating applications. Additionally, improved composite fluid-applied waterproofing membranes with intrinsic leak-detection capability is revealed.

21 Claims, 15 Drawing Sheets

Related U.S. Application Data which is a continuation-in-part of application No. 14/958,124, filed on Dec. 3, 2015, now Pat. No. 9,771,703.

(60) Provisional application No. 62/827,808, filed on Apr. 1, 2019, provisional application No. 62/745,166, filed on Oct. 12, 2018, provisional application No. 62/714,756, filed on Aug. 5, 2018, provisional application No. 62/148,312, filed on Apr. 16, 2015.

(51) Int. Cl.

| | |
|---|---|
| *G01M 3/16* | (2006.01) |
| *G01N 27/22* | (2006.01) |
| *B32B 11/06* | (2006.01) |
| *B32B 15/085* | (2006.01) |
| *B32B 15/18* | (2006.01) |
| *B32B 27/12* | (2006.01) |
| *B32B 27/30* | (2006.01) |
| *B32B 3/02* | (2006.01) |
| *B32B 3/26* | (2006.01) |
| *B32B 5/02* | (2006.01) |
| *B32B 5/26* | (2006.01) |
| *B32B 7/06* | (2019.01) |
| *B32B 7/08* | (2019.01) |
| *B32B 7/14* | (2006.01) |
| *E02D 31/02* | (2006.01) |

(52) U.S. Cl.
CPC .......... *B32B 27/302* (2013.01); *E02D 31/025* (2013.01); *G01M 3/16* (2013.01); *G01N 27/221* (2013.01); *B32B 2255/24* (2013.01); *B32B 2260/021* (2013.01); *B32B 2260/046* (2013.01); *B32B 2262/0253* (2013.01); *B32B 2262/106* (2013.01); *B32B 2307/202* (2013.01); *B32B 2307/50* (2013.01); *B32B 2307/7145* (2013.01); *B32B 2307/73* (2013.01); *B32B 2307/748* (2013.01); *B32B 2395/00* (2013.01); *B32B 2419/00* (2013.01); *B32B 2607/00* (2013.01); *E02D 2600/10* (2013.01)

(56) References Cited

U.S. PATENT DOCUMENTS

| | | |
|---|---|---|
| 3,654,765 A | 4/1972 | Healy et al. |
| 3,888,087 A | 6/1975 | Bergland |
| 4,404,516 A | 9/1983 | Johnson |
| 4,467,015 A | 8/1984 | Clem |
| 4,490,072 A | 12/1984 | Glasser |
| 4,574,541 A | 3/1986 | Raidt et al. |
| 4,704,048 A | 11/1987 | Ahlgrimm |
| 4,720,669 A | 1/1988 | Owen |
| 4,725,785 A | 2/1988 | Converse et al. |
| 4,730,953 A | 3/1988 | Tarko |
| 4,740,757 A | 4/1988 | Converse et al. |
| 4,751,467 A | 6/1988 | Cooper |
| 4,840,515 A | 6/1989 | Freese |
| 4,897,313 A | 1/1990 | Wiercinski |
| 4,943,185 A | 7/1990 | McGuckin et al. |
| 5,081,422 A | 1/1992 | Shih |
| 5,184,083 A | 2/1993 | Groover |
| 5,263,792 A | 11/1993 | Davis et al. |
| 5,288,168 A | 2/1994 | Spencer |
| 5,463,377 A | 10/1995 | Kronberg |
| 5,540,085 A | 7/1996 | Sakata et al. |
| 5,763,036 A | 6/1998 | Terry et al. |
| 5,850,144 A | 12/1998 | Howells et al. |
| 6,331,778 B1 | 12/2001 | Daily et al. |
| 7,292,155 B2 | 11/2007 | Vokey et al. |
| 7,488,523 B1 | 2/2009 | Muncaster et al. |
| 7,686,903 B2 | 3/2010 | Muncaster et al. |
| 7,872,479 B2 | 1/2011 | Lorenz et al. |
| 8,039,081 B2 | 10/2011 | Ianniello et al. |
| 8,291,668 B2 | 10/2012 | Iske et al. |
| 8,319,508 B2 | 11/2012 | Vokey |
| 8,566,051 B2 | 10/2013 | Gunness |
| 9,157,828 B2 | 10/2015 | Jaman et al. |
| 9,244,030 B2 | 1/2016 | Vokey et al. |
| 9,341,540 B2 | 5/2016 | Gunness |
| 2006/0105163 A1* | 5/2006 | Bray ............... B32B 27/06 428/339 |
| 2008/0018887 A1* | 1/2008 | Chen ............... G01N 21/956 356/237.2 |
| 2009/0044595 A1 | 2/2009 | Vokey |
| 2010/0141281 A1* | 6/2010 | Johnsen ............ G01M 3/165 324/694 |
| 2012/0074967 A1 | 3/2012 | Vokey et al. |
| 2014/0049247 A1 | 2/2014 | Gunness |
| 2014/0361796 A1 | 12/2014 | Vokey et al. |

OTHER PUBLICATIONS

Caplinq's Technical Data Sheet for LINQSTAT XVCF-Series, published Jul. 2014; four pages.

National Instruments' data sheet for 6-1/2-Digit Digital Multimeter, 1.8 MS/s Isolated Digitizer, and LCR Meter, published in 2007; five pages.

The Concrete Society—electrical conductivity webpage; published prior to Apr. 15, 2015; one page.

Military Handbook: Grounding, Bonding, and Shielding for Electronic Equipments and Facilities vols. 1 and 2 of Two Volumes, basic theory, Dec. 1987; 812 pages.

Grace Waterproofing System's data sheet for Bituthene 6000 EIM, published 2014; two pages.

Melexis Microelectroni Integrated Systems data sheet for MLX90129, published 2012; 60 pages.

MiraCLAY GM technical datasheet, 600551 Carlisle Aug. 3, 2015 (CCW_MiraCLAY_GM_TDS_Carlisle_Coatings_and_Waterproofing); two pages.

Clay-TITE Guide Specification, Section 07-17-16 W.R. Meadows Mar. 31, 2019 (Clay-Tite_Specification_and_Installation.pdf); eight pages.

Paraseal Membranes Backfilled Wall, Application Instructions, PBACKFILLEDAI-BG, Tremco Aug. 17 (Paraseal_Backfilled_wall_AI.pdf); two pages.

Paraseal technical datasheet, PARADS-BG, Tremco May 18 (Paraseal_DS.pdf); two pages.

Paraseal LG technical datasheet, PARALGDS-BG, Tremco Sep. 16 (Paraseal_LG_DS.pdf); two pages.

Paraseal GM technical datasheet, PARAGMDS-BG, Tremco Mar. 16 (Paraseal_GM_DS.pdf); two pages.

Voltext and Voltext DS product brochure, PS_VOLTEX_AM_EN_201508_V2, Cetco (ps_voltex_am_en_201508_v2-(1).pdf); two pages.

Voltext technical datasheet, TDS_VOLTEX_AM_EN_201506_V5, Cetco (tds_voltex_am_en_201506_v5.pdf); four pages.

Detec Systems TruGround Conductive Primer, Detec Systems product brochure (2019-TruGround-Brochure.pdf); two pages.

Cabot Conductive Specialty Carbon Blacks for Use in Primer Coatings Application Guide—R02 Feb. 17 © 2017 (Cabot-VulcanXC-Application-Guide-Conductive-Specialty-Carbon-Blacks-Primer-Coatings.pdf); three pages.

FibreTite, What is KEE?, FibreTite;s Special Formula, (FibreTite_What is KEE_website_download.pdf); website last accessed on May 18, 2019; two pages.

Henry Commercial Air Barrier Systems brochure—210.2US.E081 (Jul. 18) (Henry_airbarrier_brochure_web.pdf); seven pages.

Ind Electronics, Permabond Adhesives for Electronics brochure (Ind_Electronics_2015_Global1.pdf); four pages.

Iko, Bur Roofing Systems brochure—Aug. 17—MM3L251 (MM3L251_IKO_BUR_Roofing_Systems_Brochure_EN.pdf); four pages.

(56) References Cited

OTHER PUBLICATIONS

Iko, Bur Cold Cold Applied APplied Roofing Systems APplication Booklet—Apr. 18—MM3L252 (MM3L252_IKO_ColdGold_Booklet_EN_WEB.pdf); eight pages.

Iko, Torchflex Heat Welded Roofing Systems & Modiflex Fully-Adhered Roofing Systems—Mar. 19—MM3L259 (MM3L259_IKO_Torchflex-Modiflex_Product_Brochure_EN.pdf); eight pages.

Loctite brochure, ECI 1010 and ECI 1011 E&C Highly Conductive Silver Inks—14971/LT-8159 (Oct. 15) (LOCTITE_1010_1011 Brochure.pdf); two pages.

Allana, et al., 'Below-Grade Waterproofing: Failures and Solutions' Proceedings of the RCI 23rd International Convention (Paper_2008-cts-proceedings-allana.pdf); 11 pages.

Sengul and Gjorv, 'Electrical Resistivity Measurements for Quality Control During Concrete Construction' ACI Materials Journal, Nov.-Dec. 2008, Title No. 105-M61 (Paper_Electrical-Resistivity_Measurements_for_Quality_Control.pdf); eight pages.

Lima, et al., 'Bentonite electrical conductivity: a model based on series-parallel transport', Journal of Applied Electrochemistry (2010) 40: 1061-1068, Jan. 30, 2010 (Paper_Lima_2010_BentoniteElectricalConductivit.pdf); eight pages.

Muurinen, Working Report Oct. 2011, 'Measurements on Cation Exchange Capacity of Bentonite in the Long-Term Test of Buffer Material (LOT)', Jan. 2011, Posiva Oy, FI-27160 Eurajoki, Finland, (Paper_Muurinen-Measurements_CEC_Bentonite_TEST_Buffer_Material_WR_2011-10web.pdf); 30 pages.

Winandy and Beaumont, 'Roof Temperatures in Simulated Attics', 1995 US Dept. of Agriculture, Forest Service, Forest Products Laboratory, Research Paper FPL-RP-543 (Paper_Roof_Temperature_Research_USDA_FS_1995.pdf); 16 pages.

\* cited by examiner

INTEGRATED WATERPROOFING AND DRAINAGE SYSTEM WITH INTRINSIC LEAK DETECTION FOR BUILDING STRUCTURES AND METHODS OF USE

CROSS-REFERENCE TO RELATED APPLICATIONS

This patent application is a Continuation-in-Part of, and claims the priority benefit of U.S. patent application Ser. No. 15/709,980, filed on Sep. 20, 2017 for "Integrated Waterproofing and Drainage System With Intrinsic Leak Detection for Building Structures and Methods of Use", which was issued a Notice of Allowance on Feb. 14, 2019; which also claims the priority benefit of U.S. patent application Ser. No. 14/958,124, filed on Dec. 3, 2015 for "Integrated Waterproofing and Drainage System With Intrinsic Leak Detection" (now granted U.S. Pat. No. 9,771,703), and which also claims the priority benefit of U.S. Provisional Patent Application No. 62/148,312, filed on Apr. 16, 2015 for "Integrated Waterproofing and Drainage System With Intrinsic Leak Detection". This patent application also claims the priority benefit of U.S. Provisional Patent Application No. 62/714,756, filed on Aug. 5, 2018 for "Integrated Waterproofing and Drainage System With Intrinsic Leak Detection for Building Structures and Methods of Use"; U.S. Provisional Patent Application No. 62/745,166, filed on Oct. 12, 2018 for "Integrated Waterproofing and Drainage System With Intrinsic Leak Detection for Building Structures and Methods of Use"; and U.S. Provisional Patent Application No. 62/827,808, filed on Apr. 1, 2019 for "Integrated Waterproofing and Drainage System With Intrinsic Leak Detection for Building Structures and Methods of Use."

Each of the disclosures in U.S. patent application Ser. No. 15/709,980; U.S. patent application Ser. No. 14/958,124; U.S. Provisional Patent Application No. 62/148,312; U.S. Provisional Patent Application No. 62/714,756; U.S. Provisional Patent Application No. 62/745,166; and U.S. Provisional Patent Application No. 62/827,808 is hereby incorporated by reference for all purposes. If there are any irreconcilable conflicts between this patent application and any of the disclosures of the aforementioned incorporated-by-reference U.S. patent applications, then the present patent application's teachings shall govern.

BACKGROUND

The inventive disclosures contained herein pertain to the protection of building surfaces, especially subterranean walls and floor under slabs, from water penetration, but can also include horizontal and vertical above-grade applications such as decks, roofing and walls.

Related U.S. patent application Ser. No. 15/709,980 and U.S. Pat. No. 9,771,703 revealed an Integrated Waterproofing and Drainage System with Intrinsic Leak Detection that was shown to substantially lower the risk associated with the infiltration of water and moisture into subterranean structures. This risk is present across the entire lifecycle of a waterproofing system, from the specifying architects and installing contractors, to the structure's owners and occupants, and takes the form of damage to a structure's contents, direct damage to the structure itself, and compromised wellness and health of the people who live and work within the structure.

The process FMEA, as applied to an existing state-of-the-art below-grade waterproofing system—installed on existing vertical concrete foundation walls for new-construction structures identified 15 potential failure modes, which will result in water infiltration into the structure. The associated risks were shown to be unacceptably high, but the alternative Integrated Waterproofing and Drainage System with Intrinsic Leak Detection demonstrated that the risk would be mitigated down to an acceptable level through design changes, the use of different fabrication methods, and by employing new verification methodologies.

In related U.S. patent application Ser. No. 15/709,980 and U.S. Pat. No. 9,771,703, the underlying waterproofing membrane was shown to be a rubberized asphalt material in either sheet or fluid-applied forms. Additionally, for the sheet form, an electrically-conductive layer, integrated between the rubberized asphalt membrane and a thermoplastic HPDE (High-Density Polyethylene) backing membrane was revealed, and the electrically-conductive layer was shown to form the basis for providing the capability. Also, the numerous advantages of factory-integrating the waterproofing membrane with the drainage panel to create a composite waterproofing panel, before installation at the job site were revealed. Finally, various applications of the composite waterproofing panels were discussed; such as, e.g., vertical precast concrete and blind-side poured concrete vertical walls, under-slab, and plaza decks.

This application reveals further enhancements to the waterproofing membrane with intrinsic leak detection capabilities and extends its application to stand-alone configurations that may be applied in the aforementioned below-grade installations, or on vertical above-grade structural walls, or as part of cavity wall systems, or on horizontal installations such as decks, plazas and flat roofing.

This application also reveals that the waterproofing membrane may be a material other than rubberized asphalt and may be another layer or layers of any suitable moisture-resistant material such as HDPE or other thermoplastics such as polyurethane. Another material that can be used for waterproofing membranes is bentonite, a smectite mineral clay that has been used as a structural waterproofing material for nearly 100 years.

Related U.S. Pat. No. 9,771,703 revealed that clay-based materials may be washed away by excessive water over time, but modern technology has somewhat mitigated this limitation and produced bentonite-based composite waterproofing membranes that are relatively easy to store, transport and install, where the clay is structurally stabilized using thermoplastic polymer membranes and chemical means (adhesives and resins), or encapsulated between woven and non-woven geotextile fabrics layers. There are several configurations of bentonite-based waterproofing membranes on the market including:

1. Configuration 1: Granular bentonite trapped between layers of woven and non-woven geotextile fabrics, where the woven fabric is needle punched to the non-woven fabric to secure the granular bentonite both laterally and transversely to prevent clay migration within the plane formed by the waterproofing membrane.
2. Configuration 2: The geotextile-secured bentonite described in (1) may also bonded to an HDPE backing membrane, where the bentonite layer contacts the protected structure, and the HDPE membrane faces outward towards the soil, acting as another waterproofing barrier.
3. Configuration 3: A layer of granular bentonite is laminated by chemical means (a mix of rheological, tackifier, synthetic resins and adhesives additives) directly onto the HDPE backing membrane, with the bentonite layer contacting the protected structure and the HDPE backing membrane facing the soil to act as another waterproofing barrier. Sometimes, this third configuration has a layer of polypropylene, non-woven, geotextile fabric bonded over the bentonite to protect the bentonite from concrete poured during blindside installations or if shotcrete is used.

The bentonite clay can expand up to 15× its original volume when exposed to water, which creates a robust waterproof barrier in the Configurations 1 and 2 described above. This expansion represents up to an 8× increase in the thickness of the laminated bentonite layer described in Configuration 3 above.

These types of waterproofing membranes offer several advantages, such as zero VOC (Volatile Organic Compounds) emissions for Configurations 1 and 2 and very low VOC (less than 1 g/L) for Configuration 3, and the ability of install the bentonite panels on green concrete, under nearly every weather condition. The major disadvantage is the higher weight and the need to fasten the waterproofing membranes to the substrate by mechanical means (e.g. nails, staples and other penetrating devices) for vertical installations (typically along the upper edges with horizontally oriented waterproofing membrane rollout). Additionally, bentonite installations require a confinement pressure of at least 24 lb/SQF minimum to be effective, most especially in brackish or high-conductivity ground installations.

There are many different commercial product variants available on the market such as the Cetco® Voltex® line and the Carlisle® MiraCLAY® line (Configuration 1), the W.R. Meadows® CLAY-TITE® system, the Cetco® Voltex® DS line, and Carlisle® MiraCLAY® GM line (Configuration 2), and the Tremco® Paraseal® system (Configuration 3). The Voltex® and MiraCLAY® bentonite panels generally vary from 170 to 250 mils in thickness, and the HDPE membranes in the Voltex® DS, MiraCLAY® GM and CLAY-TITE® panels are 20 mils thick, while the Paraseal® line can have HDPE membranes that range between 15 to 60 mils in thickness. Bentonite waterproofing panels typically have masses of around 1 lb/SQF, while the Paraseal® GM/LG—60 mil product has a mass of 1.5 lb/SQF.

There are also hybrid waterproofing systems on the market, such as the Tremco® TREMproof® Triple Waterproofing System, which applies 60 mils of liquid asphaltic membrane to the Paraseal® LG waterproofing membrane (a geotextile-protected layer of granular bentonite layer that is backed by a 20 mil HDPE membrane). This robust system is intended for use in underslab and blindside property perimeter wall installations.

There are two primary types of smectite bentonite clays. Calcium bentonites break down to a finely granular aggregate, do not swell when exposed to water and are used as an absorbent clay known as fuller's earth. Sodium bentonites, on the other hand, can absorb large quantities of water, and in the process swell to many times their original volume, making them ideal for structural waterproofing applications. Henceforth, the terms 'bentonite' and/or 'clay' will refer to smectite sodium-bentonite clay.

Bentonite exhibits cation-exchange capacity (CEC), which is a measure of how many cations (positive ions) can be retained on the clay particle surfaces. CEC gives bentonite the ability to exchange positive and negative charges with the adjoining soil, and thus create a conduit for electrical current flow (Muurinen, Measurements on Cation Exchange Capacity of Bentonite in the Long-Term Test of Buffer Material (LOT), January 2011). Bentonite therefore exhibits measurable electrical properties such as bulk resistivity (ohms-meter) and conductivity (Siemens/meter), which change based on: the ionic properties of the adjacent soil; the amount of water absorbed; and the hydrostatic pressure exerted on clay Lima, et al, *Bentonite Electrical Conductivity: a Model Based on Series-Parallel Transport, Journal of Applied Electrochemistry*, Vol 40, Issue 6, June 2010). Furthermore, bentonite geoclay liners have been used as Electrokinetic (EK) barriers with the application of an electric field to retain contaminants within landfills (Pugh, et al., U.S. Pat. No. 6,736,568, "Electrokinetic Geosynthetic Structure").

These electrical properties may be exploited in a bentonite-based commercial waterproofing membrane to ascertain the state of the clay material (i.e., the amount of water absorbed) and whether the waterproofing barrier has been breached by water infiltration.

Note that the CEC properties of bentonite also require special care for installations with soils containing high ionic content of alkalis (salts), strong acids or excessively high soil conductivity (greater than 2500 mico-ohms/cm). Manufactures do offer bentonite formulations that are more resistant to these environments; however, soil samples are normally required to ensure that a compatible installation environment exists, and the swelling performance of the clay will be diminished (Allana, "Below-Grade Waterproofing: Failures and Solutions," Proceedings of the RCI $23^{rd}$ International convention, 2008).

Commercial roofing systems can use low-voltage leak-detection methods, such as Electronic Field Vector Mapping (EFVM), or variations of this method, such as the Detec Systems IntegriScan®. However, these methods have several limitations, including a limited ability to perform the leak-detection through multiple layers of roofing and the inability to monitor the roofing continuously for leakage after installation. That is, EFVM and related methods each serve mainly as an install-verification method for workmanship quality control.

What is needed is an intrinsic leak-detection capability in improved waterproofing membranes to enable the capability for a roofing system to be monitored continuously for the life of the installation. Furthermore, the intrinsic nature of such leak-detection would allow roofing systems with multiple layers to be continuously monitored for leakage; e.g., reading data from the intrinsic leak-detection layer of the waterproofing membrane, and using this data to enhance the performance of the waterproofing-integrity-verification method over the entire lifecycle of a waterproofing system's installation.

BRIEF SUMMARY

The inventive disclosures contained herein are designed to address the limitations of the above-identified existing art, and primarily focus upon improvements to polymer backing membranes used in state-of-the-art waterproofing membranes and the addition of an electrically-conductive channel to the membrane, thereby improving composite waterproofing membranes with intrinsic leak-detection capability. The improved waterproofing membrane can be used as a separate component within a waterproofing system or can be factory-integrated with other waterproofing components, such as the drainage board and filter fabric, as described in the above-listed cross-referenced related priority U.S. patent applications. The improved polymer backing can be cut during field installations without any noticeable differences from cutting non-improved polymer backing membranes. In variations, the electrical conduction layer may be applied using a vacuum-deposition process that does not alter the mechanical properties of the improved polymer backing membrane, which in turn facilitates manufacturability of the improved waterproofing membrane and does not compromise the mechanical function of the laminated assembly. In some embodiments, a short flap of the electrically-conductive layer of the improved polymer backing membrane may be folded back on itself and adhesively secured along one or more edges of the improved waterproofing membrane in order to expose a narrow strip of the metalized electrical conduction layer to enhance leak-detection capabilities of the system along the seams of overlap areas when the waterproofing membranes are installed. The exposed strip of a metalized electrical-conduction layer also provides a location to facilitate making electrical connections to the external sensor and when joining waterproofing panels end-to-end using pre-fabricated field joints or making connections via an improved termination bar.

The improved physical waterproofing panels and associated installation and monitoring methods described herein utilize the improved polymer backing membrane within the waterproofing panel as the functional-sensing component of the leak-detection system. The application of an external voltage—via the one connection to the electrically-conducting layer creates a potential difference across the high-resistivity waterproofing membrane with respect to the structural ground, and any moisture infiltration past the membrane to the underlying structure will be detectable. An electronic device external to the membrane is used to apply the electrical potential and measure the electrical-displacement current flowing between the electrically-conductive layer of the improved waterproofing membrane and the structural substrate, which is normally concrete. This improved configuration provides a capability to apply continuous monitoring for leakage in the protected structure.

In embodiments, the improved waterproofing membrane configuration has also been extended to bentonite clay-based waterproofing membrane. The metalized surface of the improved polymer backing membrane faces a layer of granular bentonite, wherein the bentonite may be laminated directly onto the improved polymer backing membrane, or the bentonite may be secured between two separate layers or geotextile fabric, with one side of either of the geotextile-fabric layers bonded to the improved polymer backing membrane. The metalized polymer backing layer includes features to accommodate the installation of the improved bentonite waterproofing panel to the substrate structure when mechanical fasteners are used. In variations, the surface on the bentonite side of the improved bentonite waterproofing membrane and the surface of the improved polymer backing layer of the improved bentonite waterproofing membrane may include pre-marked features that that facilitate installation of the improved bentonite waterproofing panel to the substrate structure when mechanical fasteners are used. In still more variations, the metalized polymer backing layer may be applied over the surface of an existing backing membrane of existing bentonite waterproofing membranes to provide existing panels with the improved capabilities. The electrochemical properties of bentonite can be exploited by applying an external voltage both across the bentonite layer volume and across the surface of the bentonite layer that faces the improved backing membrane. The measured displacement current that flows because of the external voltage provides an indication for the state of water saturation for the bentonite material.

In some applications, the measurement of the improved waterproofing membranes and improved polymer backing membranes is enabled using specialized Radio Frequency Identification Devices (RFID) based electronic devices to allow the state of the intrinsic leak-detection and other sensing modes to be monitored remotely through a wireless interface. The monitoring electronics can also be configured as an Internet-of-Things (IoT) edge device to place the data in the online Cloud such that the state of multiple envelope-protection installations may be analyzed for correlations and trends.

The foregoing Brief Summary is intended to merely provide a short, general overview of the inventive disclosure described throughout this patent application, and therefore, is not intended to limit the scope of the inventive disclosure contained throughout the balance of this patent application, including any appended claims and drawings.

BRIEF DESCRIPTION OF THE DRAWINGS

The following is a brief description of the Drawings provided to support the inventive disclosures herein, and it must be noted that these illustrations are not to scale and are simply intended to convey the basic mechanical structures of the apparatus depicted.

DETAILED DESCRIPTION

I. Overview

Figure 1A:
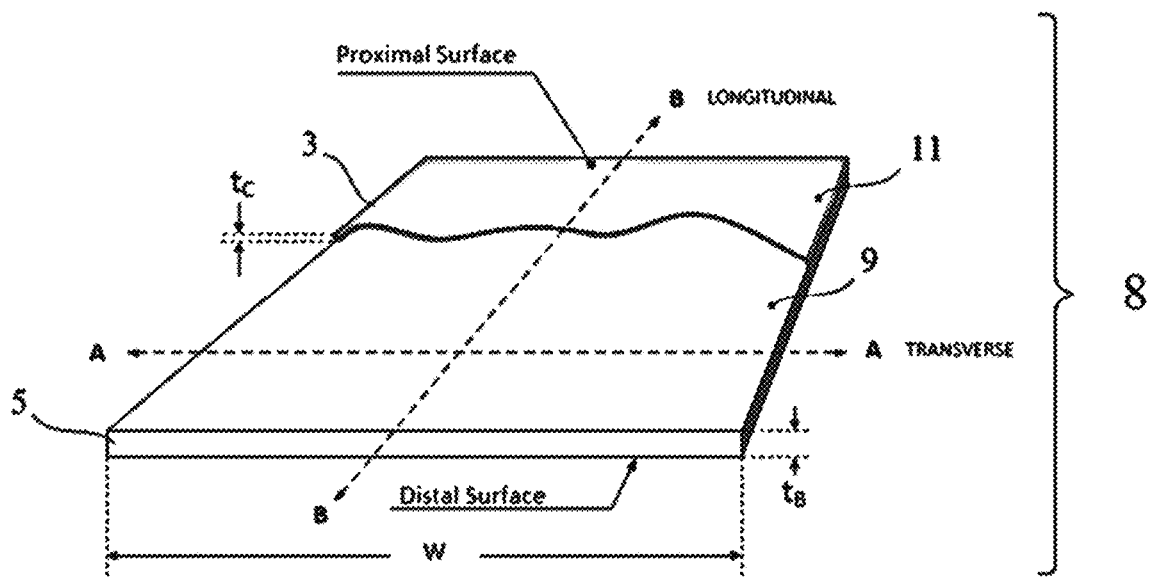
FIG. 1A depicts details for the preferred embodiment of the improved metalized polymer backing membrane for asphaltic waterproofing membranes.

The inventive disclosures contained herein are designed to address the limitations of the above-identified existing art, and primarily focus upon improvements to polymer backing membranes used in state-of-the-art waterproofing membranes and the addition of an electrically-conductive channel to the membrane, thereby improving composite waterproofing membranes with intrinsic leak-detection capability. The improved waterproofing membrane can be used as a separate component within a waterproofing system or can be factory-integrated with other waterproofing components, such as the drainage board and filter fabric, as described in the above-listed cross-referenced related priority U.S. patent applications. The improved polymer backing can be cut during field installations without any noticeable differences from cutting non-improved polymer backing membranes. Notably, only the vacuum-deposited metal embodiment exhibits no noticeable differences from cutting non-improved polymer backing membranes. The embodiments with a discrete electrically-conductive layers may experience difficulties when cutting (e.g., the discrete layer may separate from the backing membrane and possibly tear if cut with a knife that is not perfectly sharp).

In variations, the electrical conduction layer may be applied using a vacuum-deposition process that does not alter the mechanical properties of the improved polymer backing membrane, which in turn facilitates manufacturability of the improved waterproofing membrane and does not compromise the mechanical function of the laminated assembly.

In some embodiments, a short flap of the electrically-conductive layer of the improved polymer backing membrane may be folded back on itself and adhesively secured along one or more edges of the improved waterproofing membrane. The fold-back feature exposes a narrow strip of the metalized electrical conduction layer to enhance leak-detection capabilities of the system along the seams of overlap areas when the waterproofing membranes are installed. The exposed strip of a metalized electrical-conduction layer also provides a location to facilitate making electrical connections to the external sensor and when joining waterproofing panels end-to-end using pre-fabricated field joints or making connections via an improved termination bar.

The addition of an electrically-conductive layer to a waterproofing membrane as described herein provides a method for implementing an effective leak-detection capability in below-grade applications that addresses the unique challenges encountered: That is, such installations are normally buried below the ground level, severely limiting physical access. The nature of such installations prevents the use of the electrical leak-detection methods already in use for above-grade applications such as EFVM (Electronic Field Vector Mapping) and High Voltage Leak Detection (HVLD), because both methods require physical contact with the distal (outward-facing) surface of the waterproofing membrane. Thus, only a few electrical connection points to a below-grade waterproofing panel are practical, which in turn limits the complexity of the electrical-measurement methods that can be practically implemented.

This improved method utilizes the improved polymer backing membrane within the waterproofing panel as the functional-sensing component of the leak-detection system. The application of an external voltage—via the one connection to the electrically-conducting layer—creates a potential difference across the high-resistivity waterproofing membrane with respect to the structural ground, and any moisture infiltration past the membrane to the underlying structure will be detectable. An electronic device external to the membrane is used to apply the electrical potential and measure the electrical-displacement current flowing between the electrically-conductive layer of the improved waterproofing membrane and the structural substrate, which is normally concrete. This improved configuration provides a capability to apply continuous monitoring for leakage in the protected structure.

In embodiments, the improved waterproofing membrane configuration has also been extended to bentonite clay-based waterproofing membrane. The metalized surface of the improved polymer backing membrane faces a layer of granular bentonite, wherein the bentonite may be laminated directly onto the improved polymer backing membrane, or the bentonite may be secured between two separate layers or geotextile fabric, with one side of either of the geotextile-fabric layers bonded to the improved polymer backing membrane. The metalized polymer backing layer includes features to accommodate the installation of the improved bentonite waterproofing panel to the substrate structure when mechanical fasteners are used. In variations, the surface on the bentonite side of the improved bentonite waterproofing membrane and the surface of the improved polymer backing layer of the improved bentonite waterproofing membrane may include pre-marked features that that facilitate installation of the improved bentonite waterproofing panel to the substrate structure when mechanical fasteners are used. In still more variations, the metalized polymer backing layer may be applied over the surface of an existing backing membrane of existing bentonite waterproofing membranes to provide existing panels with the improved capabilities. The electrochemical properties of bentonite can be exploited by applying an external voltage both across the bentonite layer volume and across the surface of the bentonite layer that faces the improved backing membrane. The measured displacement current that flows because of the external voltage provides an indication for the state of water saturation for the bentonite material.

In many embodiments, the electrically-conducting layer in the improved polymer backing layer may be partitioned into two electrically isolated conducting pairs of sensing elements to allow the Cation Exchange Capability (CEC) properties of the bentonite clay to be exploited through electronic means to gain additional information about the bentonite's exposure to water and hydrostatic pressure. The partitioned electrically-conductive layer includes features to accommodate the installation of the improved bentonite waterproofing membrane to the substrate structure when mechanical fasteners are used. Additionally, pressure-sensitive electronic sensing devices can be added to the bentonite-facing surface of the improved polymer backing membrane to allow for direct measurement of the hydrostatic force acting on the bentonite layer laminated to the improved polymer backing membrane.

In some applications, the intrinsic leak-detection capability may be added to a fluid-applied waterproofing membrane, by using an electrically-conductive mesh, without the need to use a separate drain panel modified with a built-in electrically-conductive layer on its proximal side. Moreover, the application of the improved asphaltic waterproofing membrane with intrinsic leak-detection capabilities can be extended to above-grade applications for use in air-barrier systems and horizontal deck coatings and built-up roofing systems. Additional electrical-sensing elements may be added to enhance leak-detection and moisture-sensing capabilities when the structural substrate is non-conductive in nature.

In some embodiments, the application of a modified version of the improved polymer backing membrane with the electrically-conducting layer can also be used to provide continuous leak-detection capability for single-ply roofing systems.

In still more applications, the measurement of the improved waterproofing membranes and improved polymer backing membranes is enabled using specialized Radio Frequency Identification Devices (RFID) based electronic devices to allow the state of the intrinsic leak-detection and other sensing modes to be monitored remotely through a wireless interface. The monitoring electronics can also be configured as an Internet-of-Things (IoT) edge device to place the data in the online Cloud such that the state of multiple envelope-protection installations may be analyzed for correlations and trends.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment", "in one variation", and/or similar phrases in various places in the specification are not necessarily all meant to refer to the same embodiment.

The term "couple" or "coupled", as used in this specification, drawings, and any appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this specification, drawings, and any appended claims, refer to structures that can be uncoupled from an adjoining structure with relative ease (i.e., non-destructively and without a complicated or time-consuming process) and that can also be readily reattached or coupled to the previously adjoining structure.

The terms "transverse" and "longitudinal" as used in this specification, drawings, and any appended claims, respectively refer to the short, or width-wise, dimension (TD) of a membrane, and the long, or length-wise, dimension of a membrane. The longitudinal direction (LD), when used with a membrane, also refers to the so-called "machine" direction (MD), which is the direction a roll is processed (unrolled and/or rolled) during the manufacturing process.

As used in this specification, drawings, and any appended claims, directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and any appended claims.

Similarly, as used in this specification, drawings, and any appended claims, the terms "over" and "under", are relative terms. For example, the pressure-sensitive rubberized-asphalt adhesive coating is positioned "under" the proximal surface side because the proximal surface side is designated the composite waterproofing membrane's base. Therefore, when the proximal surface side is, for example, positioned below a basement floor or a slab, the pressure-sensitive rubberized-asphalt adhesive coating is actually over the proximal surface side, yet the pressure-sensitive rubberized-asphalt adhesive coating is still "under" the proximal surface side since the proximal surface side is designated as the composite waterproofing membrane's base.

As applicable, the terms "about" or "generally" or "approximately", as used herein unless otherwise indicated, means a margin of +−20%. Also, as applicable, the term "substantially" as used herein unless otherwise indicated means a margin of +/−10%. The terms "nominal" and "nominally" are used to indicate dimensions within a margin of +/−5%. The terms "reference" or "reference value" refer to non-critical dimensions or characteristics. The terms "typical" or "typically" refer to methods, compositions, or dimensions used in current-art applications (including when current-art applications are incorporated in the improved applications described herein). It is to be appreciated that not all uses of the above terms are quantifiable such that the referenced ranges can be applied.

As used in this specification, drawings, and any appended claims, the term "below-grade" is a construction-industry term for below-ground or subterranean installations, while the term "above-grade" is a construction-industry term for above-the-ground installations

III. An Improved Building Waterproofing System With Intrinsic Leak Detection Capabilities This Section III is directed to an improved waterproofing system with intrinsic leak detection for use in building structures, such as vertical and horizontal foundational structures that are disposed either below or above ground. Refer to FIGS. 1A though 15B.

Sheet-Applied Asphaltic Waterproofing Membranes with Intrinsic Leak Detection

Refer to FIGS. 1A, 2A, 3-6B, 10A and 10B. One embodiment of the improved polymer backing membrane 8 for asphaltic waterproofing membranes is depicted in FIG. 1A, and includes an electrically-conductive layer 3 that has been applied to the proximal surface 9 of the polymer backing membrane 5. In typical applications, the polymer backing membrane 5 material is a 90° (reference value) cross-laminated high-density polyethylene of gauge is with an average tensile strength at break in the MD/TD (machine/transverse direction) exceeding 6000 psi, when measured according to ASTM D882, and has a water-vapor-transmission rate below 0.15 gm/100 in$^2$ over a 24-hour period when measured according to ASTM E96. The membrane gauge is thickness is nominally 4 mils. In variations, the electrically-conductive layer 3 is a 99.9% or greater pure aluminum coating applied by a vacuum metal deposition (VMD) process to an optical depth $t_C$ of greater than or equal to 125 Angstroms. The aluminum VMD coating 3 has surface conductivity 11 of less than or equal to 5.0 ohms/square when measured according to ASTM D257.

Figure 2A:
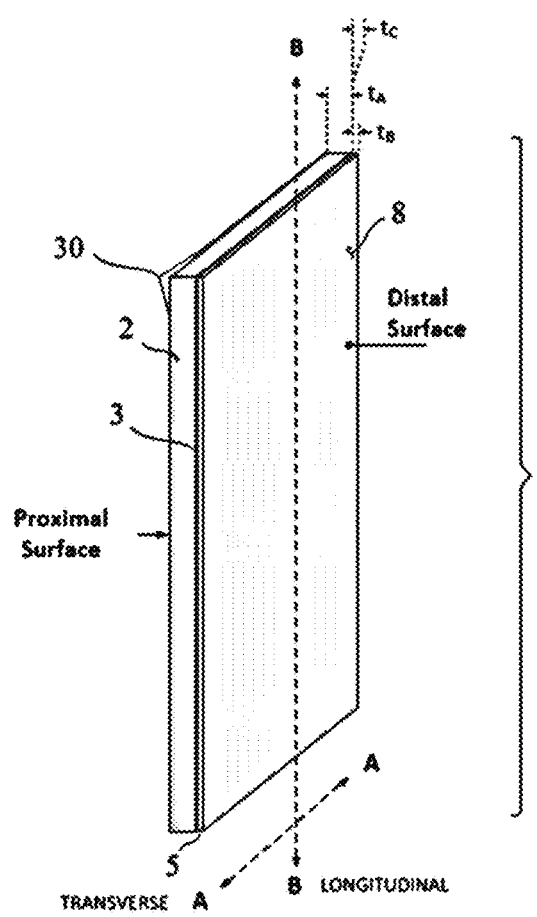
FIG. 2A depicts details of an embodiment of the improved asphaltic waterproofing membrane with its various layers.
Figure 3:
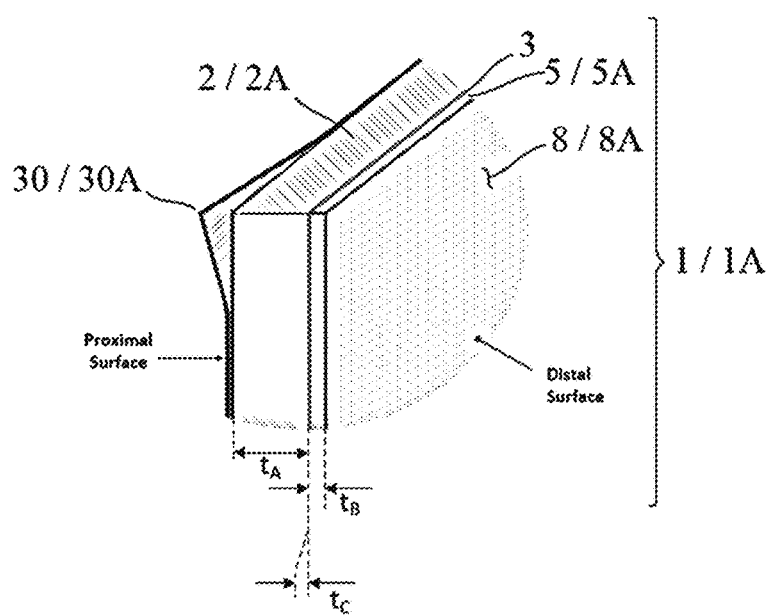
FIG. 3 depicts the preferred embodiment of the structure of the electrically-conductive component inside the improved waterproofing membrane or panel from FIGS. 1A, 1B, 2A, and 2B.

In an alternate embodiment, depicted in FIG. 2A, and with details of the various layers depicted in FIG. 3, the improved waterproofing membrane 1 has a rubberized-asphalt membrane 2 of thickness $t_A$ laminated onto a backing membrane 5 of gauge $t_B$. An electrically-conductive layer 3 is present between the polymer backing membrane 5 and the rubberized-asphalt membrane 2. One embodiment uses the improved backing membrane 8 depicted in FIG. 1A, while in other embodiments a separate electrically-conductive layer is used, such as a metalized polyethylene terephthalate (PET) membrane or a thin metal foil of thickness $t_c$ around 1 mil, which is adhesively sandwiched between the backing membrane 5 and the rubberized-asphaltic membrane 2. The proximal surface is the surface of the improved waterproofing membrane 1 nearest to the structure, which has a release liner 30 (typically made from paper or polymer sheeting) that can be removed to expose the sticky asphaltic material prior to application of the improved waterproofing membrane 1 to a substrate. The improved waterproofing membrane 1 in FIG. 1A is depicted with the longitudinal direction along Axis BB oriented vertically to the ground and the transverse direction along Axis AA oriented horizontally to the ground. This is the typical orientation used when rubberized-asphalt waterproofing membranes are installed on a wall. The dimensions of $t_A$ are can range between 40 mils to 100 mils, depending on the application, while the dimension of $t_B$ is nominally 4 mils. As stated previously, instead of coating by VMD, the electrically-conductive layer 3 can also be formed using a discrete layer of conducting material such as metalized plastic, metal foil, metal mesh, or conducting carbon-laced plastic with a surface conductivity less than or equal to 5 ohms/square; however, these non-preferred embodiments would raise the manufacturing complexity of the waterproofing membrane.

Figure 4:
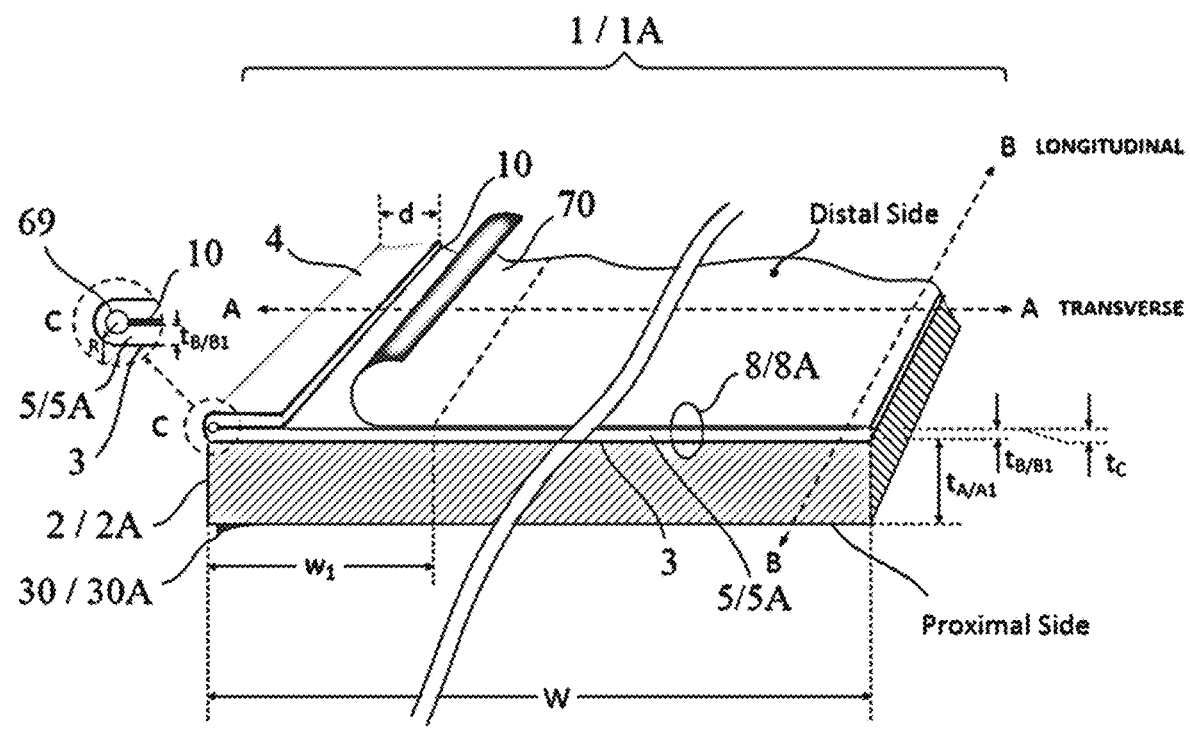
FIG. 4 depicts one embodiment of the details of the improved waterproofing membrane with its various layers from FIGS. 1A, 1B, 2A, and 2B, including the strain-relieved electrically-conductive fold-over feature.

FIG. 4 depicts an embodiment of an improved waterproofing membrane 1, with an improved polymer backing membrane 8 applied over the rubberized-asphalt membrane 2. A flap 4 of the improved polymer backing membrane 5 is extended for distance d and folded back over the distal side of the improved polymer backing membrane 5 and secured with an industrial-grade, chemically-compatible, low-volatile-organic-compound (VOC) adhesive 10. This fold-over feature 4 serves to expose a strip of electrically-conductive layer 3 at the transverse edge of the improved waterproofing membrane 1 of width d. Distance d may vary; however, with a typical length between 1 and 2 inches. A distal-side release liner 70, with distance w1 from the fold-over-feature-side 4 transverse edge of the improved waterproofing membrane 1, is made from either paper or polymer sheeting, and covers and protects the strip of electrically-conductive material 3 exposed by the fold-over feature 4 until it is removed. Distance w1 typically ranges between 4 and 6 inches. Detail C shows a strain-relief feature 69, which prevents excessive tension circumferentially along the direction of the fold-over bend within the electrically-conductive coating layer 3. As depicted in FIG. 4, the strain-relieving feature 69 takes the form of a rod-shaped strip of high-density polyethylene (HDPE) polymer, such that radius R remains no less than 1.5 times dimension $t_B$. The fold-over feature 4 as shown here, has an average thickness above the distal surface of the improved polymer backing membrane 5 of 4 to 6 mils; however, this thickness can vary in other embodiments.

Figure 5:
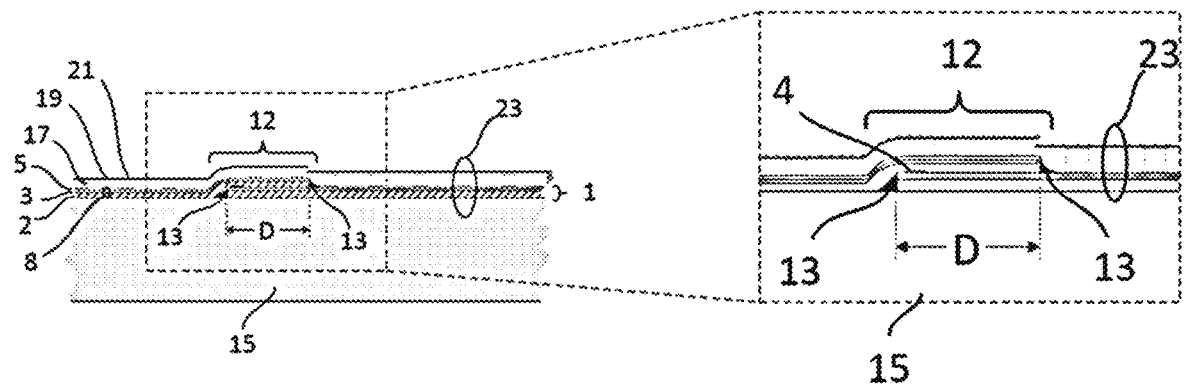
FIG. 5 depicts one embodiment of a transverse cross-sectional view with under and over end-lap details with electrically-conductive fold-over from FIG. 4 that is used to horizontally join drain panel assemblies of an improved waterproofing system, including the drainage panels, side-to-side.

FIG. 5 depicts an embodiment of a transverse cross-sectional view of a factory-integrated composite waterproofing panel 23 installed on a building substrate 15 at the vertical overlap and underlap 12 between two composite waterproofing panels 23. The overlap distance is represented by dimension D, which is generally 4 inches, but this can vary in other embodiments. The improved composite waterproofing panels 23 are comprised of an improved waterproofing membrane 1 and asphaltic layer 2, with the improved polymer backing membrane 8 that incorporates an integrated electrically-conductive layer 3. The drainage panel 17 is shown on the distal-side of the polymer backing membrane 5, and the filter layer 19 is shown on the distal side of the drainage panel 17. The anti-abrasion layer 21 is shown on the distal side of the filter layer 19. A detail of the overlap and underlap 12 area is shown in the dashed-rectangular box with a depiction of the fold-over electrically-conductive layer flap 4 on the left edge of the improved waterproofing membrane 1. If the improved waterproofing membrane 1 detailing adhesive mastic filets 13 are improperly applied, then water or moisture could infiltrate the seam between the overlapping membranes; however, the fold-over flap 4 of electrically-conductive layer 3 facilitates the ability to sense the presence of the leakage.

Figure 6A:
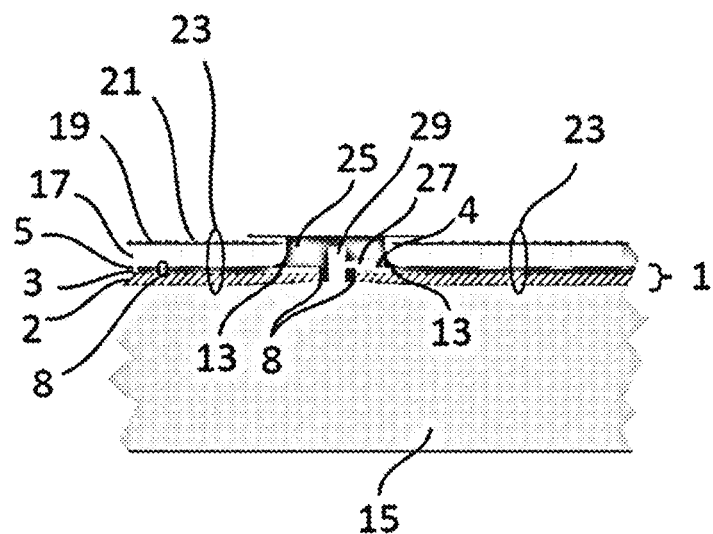
FIG. 6A depicts one embodiment of a longitudinal cross-sectional view with details of a horizontal field joint with electrically-conductive elements of FIG. 4 that is used to vertically join drain panel assemblies of an improved waterproofing system of FIG. 5 end-to-end.
Figure 6B:
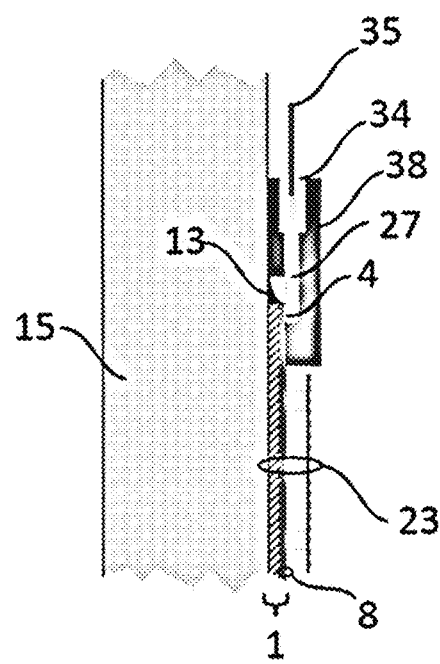
FIG. 6B depicts one embodiment of a longitudinal cross-sectional view of the upper edge of the mechanically-captured and electrically terminated installed improved waterproofing system of FIG. 5 captured with a specially-designed termination bar.
Figure 6C:
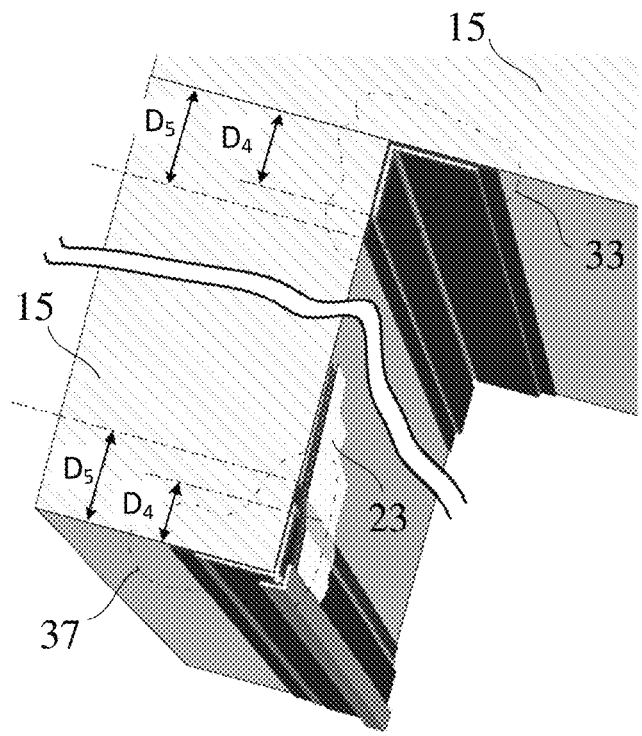
FIG. 6C depicts one embodiment of the installation details of the improved waterproofing system with inside and outside corner assemblies.
Figure 6D:
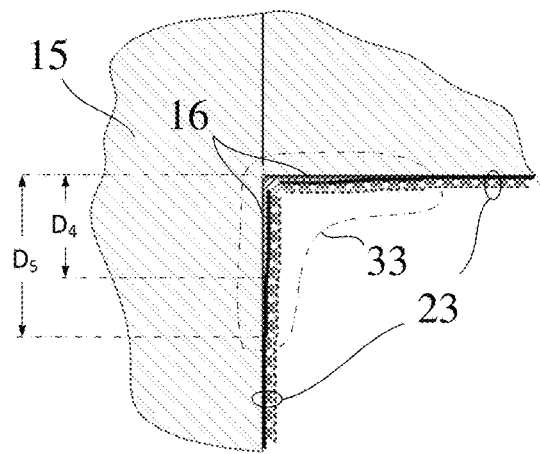
FIG. 6D depicts one embodiment of the cross-sectional details of the inside-corner assembly of an improved waterproofing system from FIG. 6C.
Figure 6E:
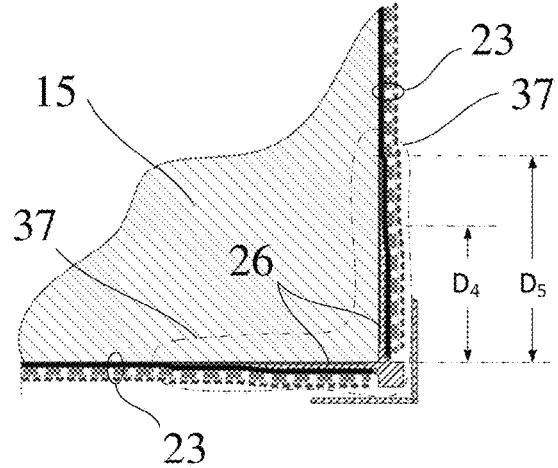
FIG. 6E depicts one embodiment of the cross-sectional details of the outside-corner assembly of an improved waterproofing system from FIG. 6C.
Figure 6F:
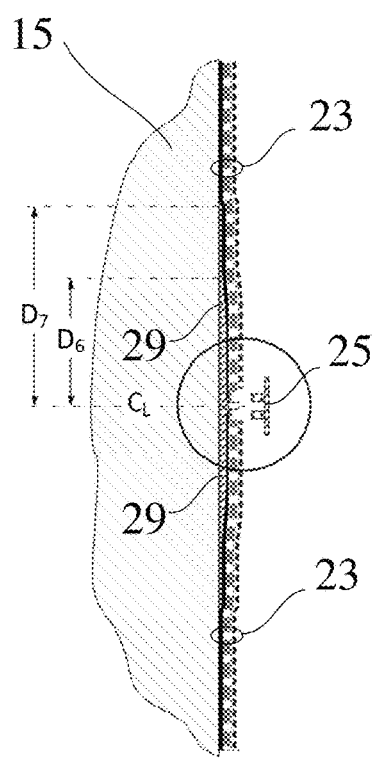
FIG. 6F depicts one embodiment of a cross-sectional view of a horizontal field joint that is used to vertically join drain panel assemblies of an improved waterproofing system end-to-end.
Figure 6G:
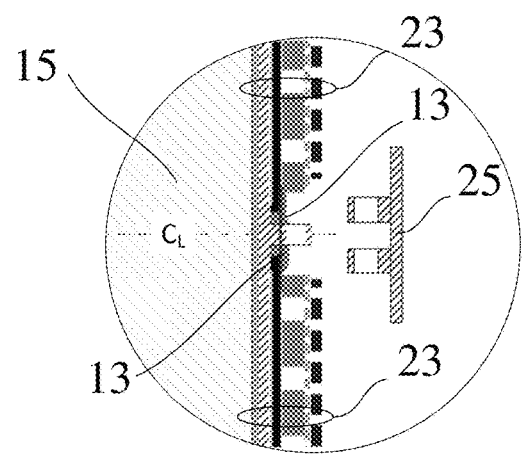
FIG. 6G depicts one embodiment of the detail of the horizontal field joint depicted in FIG. 6F.

FIG. 6A depicts an embodiment of a longitudinal cross-sectional view of the factory-integrated composite waterproofing panel 23 installed on a building substrate 15, with details shown at the horizontal field-joint 29 and 25 between two composite waterproofing panels 23 described in FIGS. 6F and 6G, where dimension $D_6$ represents the extruded core of the horizontal field-joint 29 distance from centerline CL, and dimension $D_7$ represents the horizontal field-joint 29 underlap distance from centerline CL, with integrated composite waterproofing panel 23. The improved composite waterproofing panels 23 are comprised of an improved waterproofing membrane 1 and rubberized-asphaltic layer 2, including an improved polymer backing membrane 8 with integrated electrically-conductive layer 3. The drainage panel 17 is shown on the distal-side of the polymer backing membrane 5, and the filter layer 19 is shown on the distal side of the drainage panel 17. The anti-abrasion layer 21 is shown on the distal side of the filter layer 19. The fold-over flap 4 of electrically-conductive layer 3 on the transverse edge of the improved waterproofing membrane 1 is depicted as it would be viewed longitudinally, so in this illustration it appears as a double improved polymer backing membrane 8. An electrically-conductive feature 27 is shown within the horizontal field-joint polystyrene strip cap 29, which contacts the upper edge of fold-over flap 4 of electrically-conductive layer 3. An electrical drain wire (not shown) can be run within the drain panel layer 17 from the horizontal field-joint 29 and 25 to the upper edge of the composite waterproofing panel 23 nearest the earth surface to make a single-node electrical connection to this lower panel. Detailing adhesive mastic 13 is used to seal the joints of the improved waterproofing membrane 1, and in some embodiments, the adhesive mastic 13 is introduced under pressure to channels (not shown) molded into the polystyrene strip cap 29. A self-locking feature (not shown, but could be molded or extruded ratcheting barbs) where the strip cap 25 engages the horizontal field-joint 29, ensures that the strip cap 25 and the horizontal field-joint 29 will not become disengaged from the application of detailing adhesive mastic 13.

In a similar embodiment to that described for the horizontal field-joint in FIG. 6A, the membrane-edge-sealing method is used on the factory-formed inner 33 and outer 37 polystyrene corner field joints as depicted in FIGS. 6C, 6D, and 6E, where the application of detailing adhesive mastic 13 is performed under pressure through pre-formed channels in the field joints. At these points, a similar electrical-connection feature can be employed, as described for FIG. 6A, to allow the inner and outer polystyrene corner field-joints to serve as electrical leak-detection elements. Because the inner 33 and outer 37 polystyrene corner field-joints run vertically, in another embodiment, the inner and outer field-joints are electrically integrated with the composite waterproofing panels 23 using the fold-over electrically-conductive layer flap 4, as described for the horizontal field joint in FIG. 6A; however, but in this case, no electrical-drainage wire is required to make the electrical connection. In FIGS. 6C, 6D, and 6E, dimension $D_4$ represents the extruded core of the inner 33 and outer 37 field-joint distances from the filed-joint corners, and dimension $D_7$ represents the inner 33 and outer 37 field-joint underlap distances with integrated composite waterproofing panel 23.

FIG. 6B depicts the details of one embodiment of a longitudinal cross-sectional view of the factory-integrated composite waterproofing panel 23 installed on a building substrate 15 at the upper edge where the improved waterproofing membrane 1 terminates. The fold-over flap 4 of electrically-conductive layer 3 on the transverse edge of the improved waterproofing membrane 1 is depicted as it would be viewed longitudinally, so in this illustration it appears as a double improved polymer backing membrane 8. An electrically-conductive feature 27 is shown within the improved termination bar 38, which is used to contact the fold-over flap 4 of electrically-conductive layer 3 on the transverse edge of the improved waterproofing membrane 1. A connector port 34 is used to provide electrical connection(s) 35 to externally-mounted monitoring circuitry. The improved termination bar 38 also provides an electrical-connection point for the lower panel electrical drain wires (not shown) and under-slab electrical drain wires (not shown). Detailing adhesive mastic 13 is used to seal the top edge of the composite waterproofing membrane 1 by introducing the sealing adhesive mastic 13 under pressure to channels (not shown) molded into the improved termination bar 38. The sealing adhesive mastic 13 can also be applied as a fillet to the top edge of the composite waterproofing membrane 1 before the improved termination bar 38 is installed.

Sheet-Applied Bentonite Waterproofing Membranes with Intrinsic Leak Detection

Figure 1B:
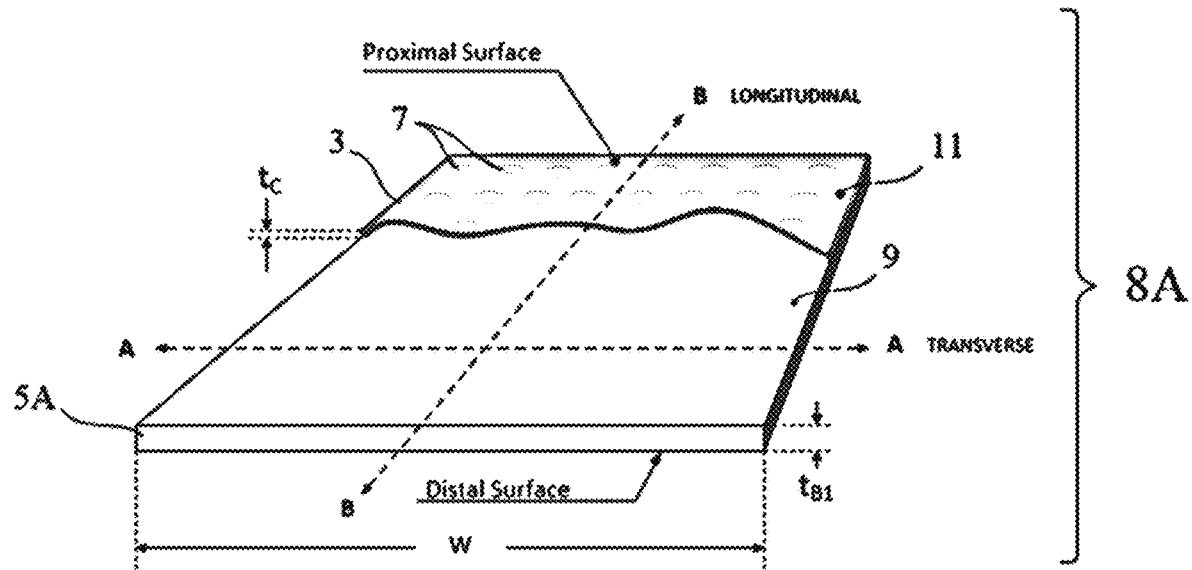
FIG. 1B depicts details for the preferred embodiment of the improved metalized polymer backing membrane for bentonite waterproofing membranes.

Refer to FIGS. 1B, 2B, 3, 4, 7A-7C, and 8. An embodiment of the improved polymer backing membrane 8A for bentonite waterproofing membranes is depicted in FIG. 1B, and the specifications are identical to those of the improved polymer backing membrane for asphaltic waterproofing membranes as depicted in FIG. 1A, except that the polymer backing membrane 5A has a gauge of tin and metal electrical-sensing layer 3 has a plurality of openings 7, wherein the dimension tin typically ranges between 15 and 60 mils, depending on the improved bentonite waterproofing membrane 1A configuration. The VMD process facilitates the creation of the plurality of openings 7 with the use of a removable masking layer during the metallization process. The plurality of openings 7 can be up to 2 inches in diameter each and spaced every 18" to 36" on opening 7 centers; however, these dimensions should be understood to be notional and are provided for reference purposes only. Actual diameters and spacing distances are optimized for installations with mechanical fasteners 36 as recommended by the waterproofing-membrane manufacturer or manufacturers.

Figure 2B:
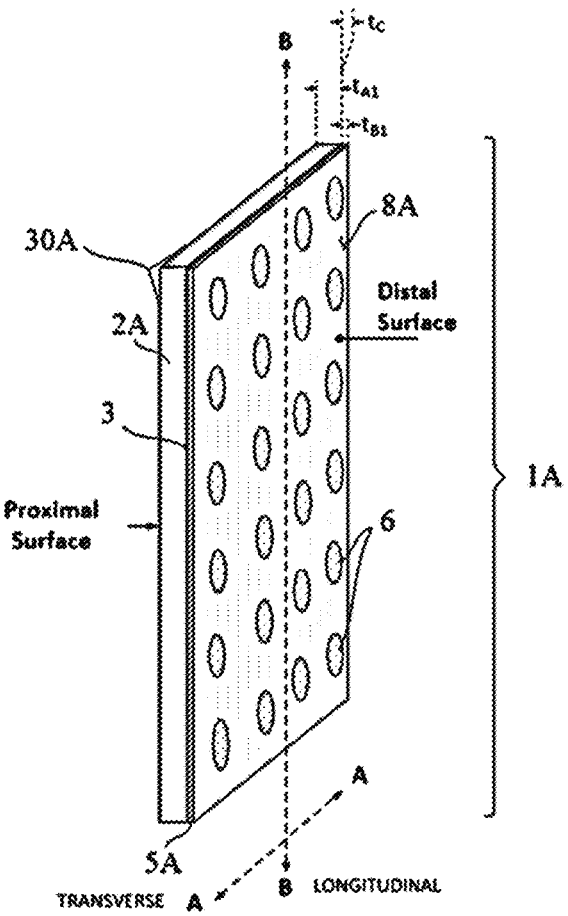
FIG. 2B depicts details of an embodiment of the improved bentonite waterproofing membrane with its various layers.

In an embodiment depicted in FIG. 2B, with details of the various layers depicted in FIG. 3, the improved bentonite waterproofing membrane 1A has a layer of bentonite 2A of thickness tai with backing membrane 5A of gauge $t_{B1}$. An electrically-conductive layer 3 is present between the polymer backing membrane 5A and the bentonite layer 2A. The preferred embodiment uses the improved backing membrane 8A depicted in FIG. 1B, while other embodiments could use a separate electrically-conductive layer, such as a metalized polyethylene terephthalate (PET) membrane or a thin metal foil of thickness to of about 1 mil, which is adhesively sandwiched between the backing membrane 5A and the layer of bentonite 2A. The proximal surface is the surface of the improved waterproofing membrane 1 nearest to the structure, which for some embodiments, has a non-woven, polypropylene-geotextile, fabric layer 30A that provides protection for the bentonite layer 2A during blindside applications when concrete is poured, or if shotcrete is applied. The distal surface is the surface of the improved bentonite waterproofing membrane 1A furthest from the substrate of the building structure, and the proximal surface is the surface of the improved bentonite waterproofing membrane 1A closest to the building substrate 15. In an embodiment, the layer of bentonite 2A can be laminated onto the improved polymer backing membrane 8A, as described for current-art bentonite Configuration 2 in the Background section, supra, or for another embodiment, the bentonite layer 2A can be secured between layers of woven and non-woven, polypropylene-geotextile fabric 30A that are bonded to the improved polymer backing membrane 8A as described for current-art bentonite Configuration 1 in the Background section, supra. Note that for the current-art bentonite Configuration 2, where the layer of bentonite 2A is laminated onto the improved polymer backing membrane 8A, it may be necessary to introduce a fill of particulate carbon or graphite into the laminate material to make the laminate bond electrically conductive to ensure electrical communication between the bentonite layer 2A and electrically-conductive layer 3. The percentage fill of graphite or carbon would be sufficient to reduce the resistivity of the laminate material to the resistivity levels of compacted bentonite clay (in the range of 3.27E3 to 1.07E5 ohms-m, per Table 2 of Lima et al, *Bentonite Electrical Conductivity: a Model Based on Series-Parallel Transport, Journal of Applied Electrochemistry*, Vol 40, Issue 6, June 2010).

In FIG. 2B, the improved waterproofing membrane 1A is depicted with the longitudinal direction along Axis BB oriented vertically to the ground and the transverse direction along Axis AA oriented horizontally to the ground. It should be noted that for bentonite-based waterproofing membranes, the installation direction is generally in the horizontal direction, such that the longitudinal direction along Axis BB would be oriented horizontal to the ground. In variations, a plurality of features 6 can be stenciled onto the distal surface of the improved polymer backing membrane 8A to indicate areas where it would be safe to drive a mechanical fastener 36 through the improved bentonite waterproofing membrane 1A to fasten the panel to the building substrate 15. General dimensions for is typically range from 15 to 60 mils for the improved polymer backing membrane 8A, while thickness to for the bentonite layer 2A can be as much as about 250 mils. These dimensions can vary from manufacturer to manufacturer. It should be noted that the electrically-conductive layer 3 applied to HDPE backing membranes 5A to create an improved polymer backing membrane 8A can also work effectively with hybrid panels, as described for state-of-the-art bentonite Configuration 3 in the Background section, supra, wherein leakage through the improved polymer backing membrane 8A, the bentonite layer 2A, and the proximal side asphaltic membrane layer (not shown) can be sensed electrically.

FIG. 4 depicts an embodiment of the improved bentonite waterproofing membrane 1A, with the improved polymer backing membrane 8A applied over the bentonite layer 2A. A flap 4 of the improved polymer backing membrane 5A is extended for distance d, and folded back over the distal side of the improved polymer backing membrane 5A, and secured with an industrial-grade chemically-compatible low volatile organic compound (VOC) adhesive 10. This fold-over feature 4 serves to expose a strip of electrically-conductive layer 3 at the transverse edge of the improved bentonite waterproofing panel 1A of width d. Distance d may vary; however, and a general length can be between 1 and 2 inches. A distal-side release liner 70, with distance w1 from the fold-over 4 feature-side transverse edge of the improved bentonite waterproofing panel 1A, made from either paper or polymer sheeting, covers and protects the strip of electrically-conductive material exposed by the fold-over feature 4 until it is removed. Distance w1 generally ranges between 4 and 6 inches. Detail C shows the strain-relief feature 69 that prevents excessive tension circumferentially along the direction of the fold-over bend within the electrically-conductive coating layer 3. As depicted in this embodiment, the strain-relieving feature 69 takes the form of a rod-shaped strip of HDPE polymer, such that radius R remains no less than 1.5× dimension $t_{B1}$. The fold-over feature 4 as shown here, has an average thickness above the distal surface of the improved polymer backing membrane 5A of between 30 to 180 mils, but this can vary in other embodiments. It should be noted that in an alternate embodiment, as depicted in FIG. 7B, the improved bentonite waterproofing membrane 1A1 offers a more-practical platform for the addition of the fold-over flap 4 because the improved backing membrane 5 is the same configuration used for the improved asphaltic waterproofing membrane 1 depicted in FIG. 2A, and the improved backing membrane 5 has the same thickness $t_B$, which is normally about 4 mils. This lowers the average thickness above the distal surface, from the improved polymer backing membrane 5A dimension of 30 to 80 mils, to the improved polymer backing membrane 5 dimension from 4 to 6 mils.

Figure 7A:
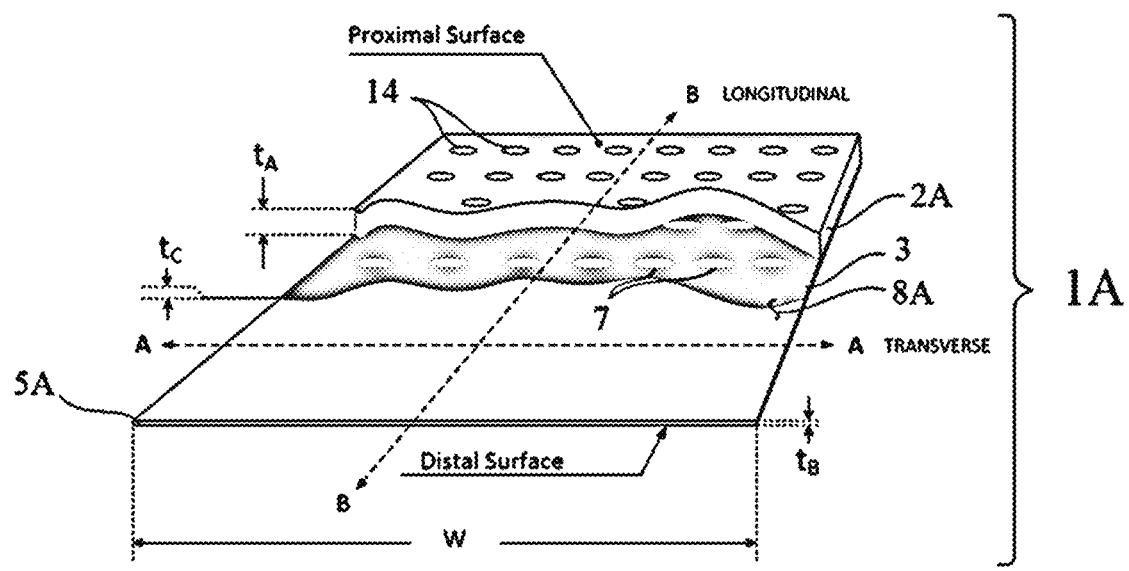
FIG. 7A depicts one embodiment of an improved bentonite waterproofing membrane with its various layers.
Figure 7B:
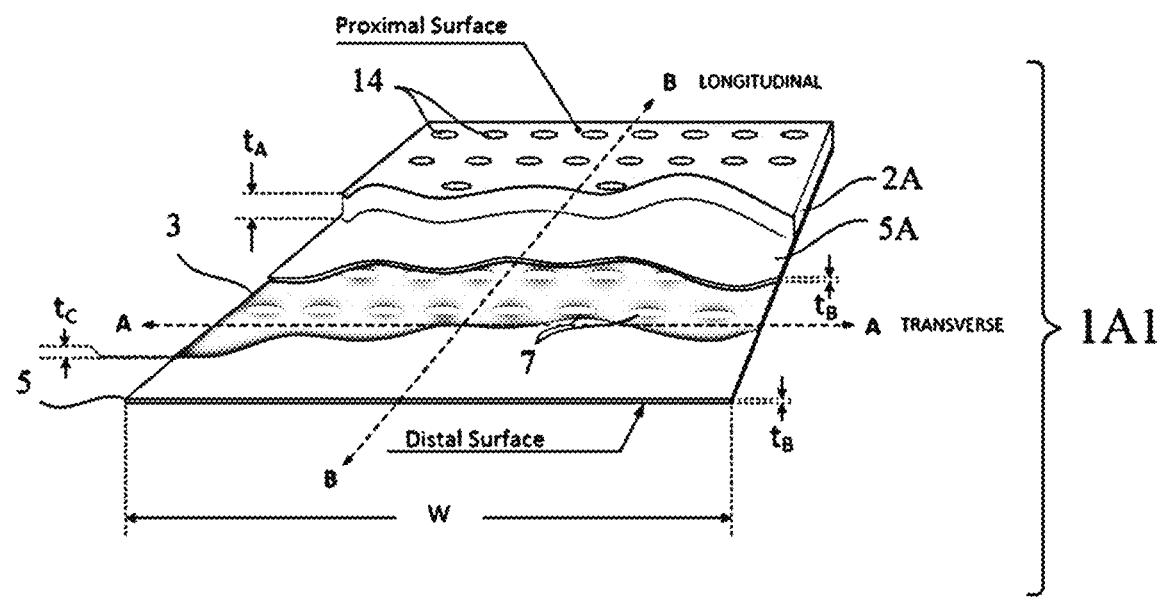
FIG. 7B depicts an alternate embodiment of an improved bentonite waterproofing membrane with its various layers.

FIG. 7A depicts the preferred embodiment of the improved bentonite waterproofing membrane 1A with an improved polymer backing membrane 8A, an electrical-sensing layer 3, and with bentonite layer 2A laminated into the proximal surface of the improved polymer backing membrane 8A. In variations, the proximal surface of bentonite layer 2A has a plurality of safe-zone indicator features 14 aligned with the plurality of openings 7 in the electrical-sensing layer 3 of the improved polymer backing membrane 8A, which is placed onto the proximal surface of the bentonite layer 2A to indicate areas where it is safe to drive mechanical fasteners 36 through the improved bentonite waterproofing membrane 1A in order to attach the panel to the soldier pile wood lagging (not shown) for blindside installations. The bentonite layer 2A is also be covered by a protective layer of non-woven, polypropylene-geotextile fabric 30A that can accept the markings for the plurality of safe-zone indicator features 14.

FIG. 7B depicts another embodiment of an improved bentonite waterproofing membrane 1A1 that has a current-art bentonite waterproofing membrane of Configuration 3, as described in the Background Section, supra, bonded with low VOC industrial adhesive to improved polymer backing membrane 8A with electrical-sensing layer 3 and with a plurality of openings 7. The improved Configuration 3 bentonite waterproofing membrane has also been modified with a plurality of safe-zone indicator features 17, aligned with the plurality of openings 7 in the electrical sensing layer 3 of the improved polymer backing membrane 8A, that would indicate areas where it is safe to drive a mechanical fastener 36 through the improved bentonite waterproofing membrane 1A1 in order to attach the panel to the soldier pile wood lagging (not shown) for blindside installations. The bentonite layer 2A can also be covered by a protective layer of non-woven, polypropylene-geotextile fabric 30A that can accept the markings for the plurality of safe-zone indicator features 14. This alternate embodiment is useful as a modification to provide existing state-of-the art bentonite waterproofing panels with intrinsic leak-detection capability.

Figure 7C:
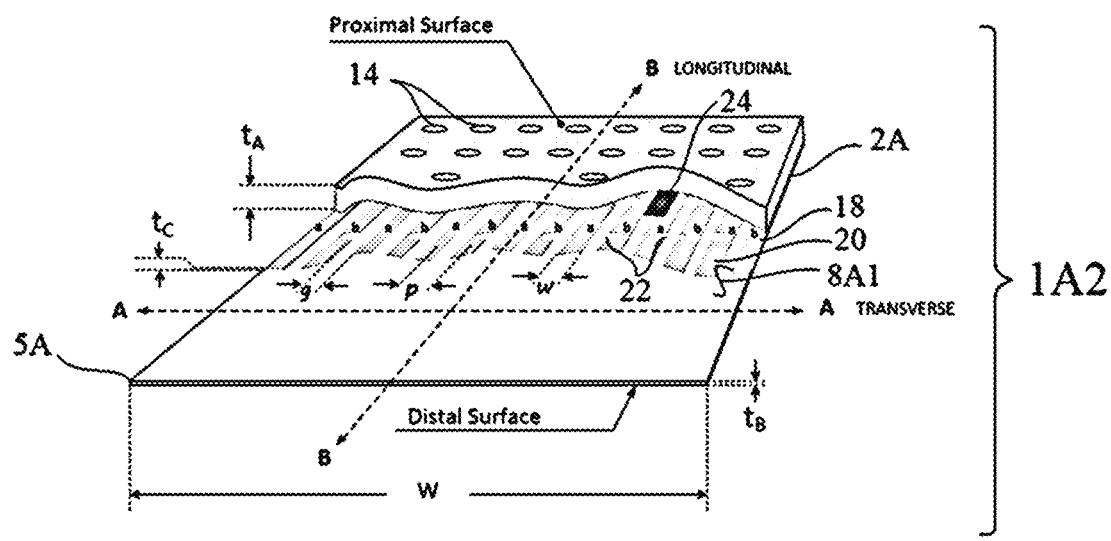
FIG. 7C depicts another alternate embodiment of an improved bentonite waterproofing membrane with its various layers.

FIG. 7C depicts another embodiment of the improved bentonite waterproofing membrane 1A2, wherein the electrical sensing layer 3 of another embodiment of the improved polymer backing membrane 8A1 has been partitioned into a plurality of electrically isolated a and b pairs of sensing elements 18, 20, with a plurality of openings 22. The sensing elements 20 and 18 has a width of w arranged with center-to-center spacing p to create gaps of distance g between each a and b pair in the array of sensing elements 18, 20. The number of sensing element 18, 20 pairs a, b, and distance g is optimized to the electrical conductivity of the bentonite layer when the layer is both dry and wet when saturated with water. The VMD process with a removable mask facilitates the creation of these a and b pairs of electrical-sensing elements 18, 20. A fixed DC electric field or time-varying AC electric field is created between the a and b sensing elements 18, 20 to measure the cation-exchange capacity (CEC) properties of the bentonite 3. The data gathered can be useful to determine how much water the bentonite 3 has absorbed and the state of the hydrostatic pressure being exerted by ground water on the improved bentonite waterproofing membrane 1A2. Additionally, a thin membrane-based pressure sensor 24 can be placed on the proximal surface of alternate embodiment of improved backing membrane 8A1 and under the bentonite layer 2A to provide a direct measurement of the hydrostatic pressure being exerted by ground water on the alternate embodiment improved bentonite waterproofing panel 1A2. This pressure sensor 24 may be formed from a thin layer of piezo-electric or piezo-resistive material electrically configured to allow the pressure signal to be externally read, and because the exerted hydrostatic pressure is a global parameter, only one sensor per long length of panel (20 or 30 feet), or even as few as one or two sensors per wall, would be needed.

The proximal surface of bentonite layer 2A has a plurality of safe-zone indicator features 14, aligned with the plurality of openings 22, that can be placed onto the proximal surface of the bentonite layer 2A in order to indicate areas where it is safe to drive a mechanical fastener 36 through the waterproofing membrane 1A2 to attach the panel to the soldier pile wood lagging (not shown) for blindside installations. The bentonite layer 2A is also covered by a protective layer of non-woven, polypropylene-geotextile fabric 30A that accepts the markings for the plurality of safe-zone indicator features 14.

Figure 8:
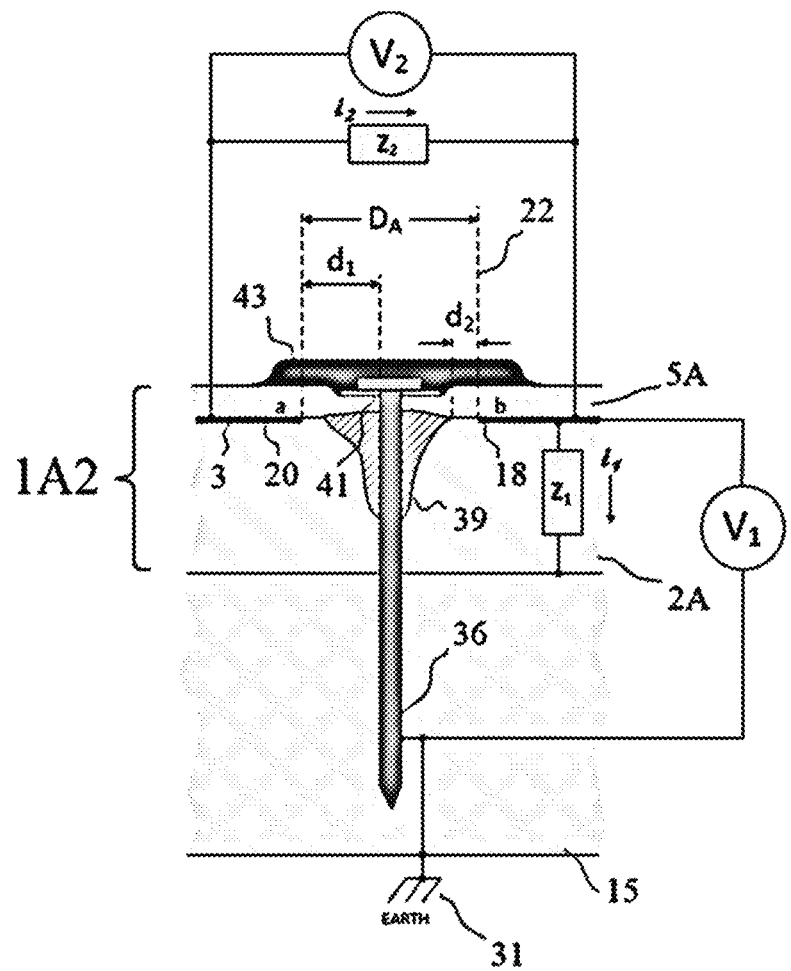
FIG. 8 depicts details of the electrical effects from a metal fastener on the improved waterproofing membrane shown in FIG. 7C.

FIG. 8 depicts a notional electrical schematic superimposed on a diagram of a cross-sectional detail of the alternate embodiment of improved bentonite waterproofing membrane 1A2 depicted in FIG. 7C. For clarity, the FIG. 8 illustration is depicted horizontally instead of vertically. Here, the alternate embodiment of the improved polymer backing membrane 8A1 has been pierced by mechanical fastening device 36 driven through washer 41, which also rests against the distal surface of improved polymer backing membrane 8A1. The mechanical fastening device 36 also penetrates the bentonite layer 2A and is secured within the building substrate 15, which also serves as the electrical earth-ground 31. An electrically-conducting mechanical fastening device 36, such as a metal nail, also becomes the electrical earth-ground reference 31 because of its direct contact with the building substrate 15. Either an overlap from an adjoining waterproofing membrane (not shown) or mastic detailing adhesive compound 46 is placed over the head of the mechanical fastening device 36 to prevent an electrical short-circuit between the ground water outside the improved waterproofing membrane and the building substrate 15. The electrically-conductive layer 3 has not been pierced by the mechanical fastening device 36, and instead, the mechanical fastening device 36 passes through one of the plurality of openings 22 with diameter DA in the a and b pairs of electrical sensing elements 20 and 18. Distance $d_1$ exists between the mechanical fastening device 36 and the nearest electrical sensing elements 20 or 18. Here, water has entered the gap between the alternate embodiment of improved polymer backing membrane 1A2 and shaft of the mechanical fastening device 36 causing the bentonite in the immediate location to absorb the water and swell as shown by the moisture-affected area 39, thereby sealing the leak. Distance $d_2$ exists between the edge of the water swollen bentonite in moisture-affected area 39 and the nearest electrical-sensing elements 18, 20.

In reading Mode 1, a time-varying voltage source $V_2$ is created between sensing element 20a and sensing element 18b. Complex impedance $Z_2$ exists between element 20a and sensing element 18b with a displacement current $i_2$ created by time-varying voltage source $V_2$, which reads as a current-controlled voltage by an external electronic-readout device 90. Information can be obtained about the state of the bentonite in moisture-affected area 39 by reading displacement current $i_2$ flowing between sensing element 20a and sensing element 18b. Refer to FIGS. 9A and 10A through 10C, which depict a notional placement for an external electronic-readout device 90.

In reading Mode 2, a time-varying voltage source $V_1$ is created between sensing elements 11a and 10b that are externally-connected by the external electronic reading device 90 into a single-potential electrical node. Complex impedance $Z_1$ then exists between the single-potential electrical node comprised of externally-connected sensing elements 11a and 10b, with displacement current $i_1$ created by time-varying voltage source $V_1$, which reads as a current-controlled voltage by an external electronic-readout device 90. Information can be obtained about the state of the bentonite in moisture-affected area 39 by reading displacement current $i_1$ flowing between the single-potential electrical node (comprised of externally-connected sensing elements 11 *a* and 10 *b*) and the electrical earth-ground reference 31 present at the mechanical fastening device 36.

Any abnormal conditions, such as when a mechanical fastening device 36 touches the electrically-conductive layer 3 (i.e., distance $d_1 \leq 0$) will create a short-circuit with impedance $Z_1=0$ ohms, providing indication of the abnormal condition to the external electronic-readout device 90. This would be indicative of either an improperly installed waterproofing membrane or a damaged waterproofing membrane. Continuing leakage of water into the bentonite layer 3 will increase the size of the moisture-affected area 39 that will continue to alter displacement currents $i_1$ and $i_2$, providing indication to the external electronic-readout device 90 that water has penetrated the improved polymer backing membrane 5A and entered the bentonite layer 2A. A complete breach or water-saturation of bentonite layer 2A will allow groundwater to alter displacement currents $i_1$ and $i_2$, providing indication to the external electronic-readout device 90 that water has fully penetrated the improved polymer backing membrane 5A and that the bentonite layer 2A may be in danger of washing away. Note that unlike the asphaltic layer 2 in the improved waterproofing membranes of FIGS. 1A, 3, 4, and 9A (and other associated embodiments), where the resistance of the membrane material 2 is in the range of a few megohms to hundreds of megohms (10E6 to 10E8 ohms) as depicted in FIG. 9D, the resistance of the bentonite layer 2A will only be in the range of tens-of-ohms to perhaps a few hundred or perhaps a thousand ohms (10E1 to 10E3 ohms), which would require much less applied voltage $V_1$ to produce a measureable displacement current $i_1$.

As described in the Background section, supra, the typical mass of commmercially-available bentonite membranes is 1.01b/SQF and the bentonite layer is typically 0.250 inches in thickness, which equates to a density of 0.77 gm/cm^3. Table 5 of Lima et al, *Bentonite Electrical Conductivity: a Model Based on Series-Parallel Transport, Journal of Applied Electrochemistry*, Vol 40, Issue 6, June 2010, provides experimental data that shows that bentonite with a density of 0.77 gm/cm^3 that has been saturated with 0.01 Mole NaCl water has a measured surface conductivity of 0.587 S/m and a measured volume conductivity of 5.87× 10E-5 S/m. These conductivity values equate to 0.0017 ohms and 16.8 ohms (respectively) across a distance of 0.250 inches. Table 1 below summarizes these findings:

TABLE 1

Conductivity of Water-Saturated Bentonite
(0.77 gm/cm^3 Bentonite Loading Saturated With 9.01M NaCl Water)

| Volume Conductivity | | | |
|---|---|---|---|
| 0.587 S/m | 1.70 ohms-m | 0.02 ohms-cm | 0.0017 ohms (0.25 inches) |
| Surface Conductivity | | | |
| 5.87E−05 S/m | 17,035.38 ohms-m | 170.36 ohms-cm | 16.767 ohms (0.25 inches) |

The data in Table 1 above indicates that when saturated with ground water, the electrical conductivity values of the bentonite layer 2A will change dramatically, from extremely high resistance when dry (in the range of several megohms) to very low resistance across a distance of 0.250 inches for both the surface impedance $Z_2$ measurement using sensing element 20, 18 pairs a, b for applied voltage $V_2$, and the layer impedance $Z_1$ measurement for applied voltage $V_1$, as depicted in FIG. 8. This dramatic change in bentonite conductivity can be exploited for quality-control purposes, whereby external voltages are applied to uninstalled bentonite membranes that have been in storage or shipped to job sites, in order to ensure that a bentonite membrane was not exposed to excessive moisture prior to installation.

Installation Configurations of Waterproofing Membranes and Panels With Intrinsic Leak Detection Refer to FIGS. 9A, 9B, 10A, 10B, and 10C, which depict several embodiments of below-grade installations of improved waterproofing membranes 1 and bentonite waterproofing membranes 1A.

Figure 9A:
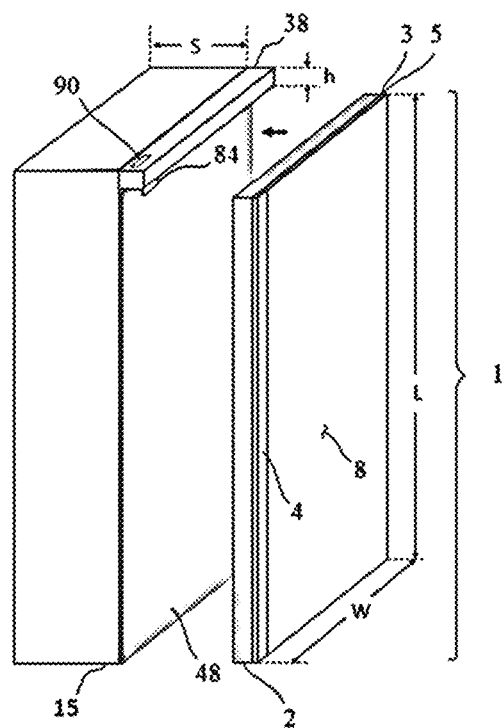
FIG. 9A depicts one embodiment for application of the improved waterproofing membrane of FIG. 2A to a vertical precast concrete wall.

FIG. 9A depicts the details of one embodiment of an improved waterproofing membrane 1 with an electrically-conductive fold-over flap 4 being installed on a building substrate 15. The installation also features an improved termination bar 38 with an electrical contact feature 84, an electronic-readout device 90, and concrete primer 48 applied to the substrate 15. In variations, the concrete primer 48 can be electrically-conductive or electrical-static dissipating, or the concrete primer 48 can be an electrically-conductive film material to facilitate the installation-verification method by capacitive coupling as shown in FIGS. 9E, 9F, and 9G. The conductive primer 48 can be a carbon or graphite suspension such as Detec Systems® Inc. TruGround® primer with a surface conductivity less than or equal to 10,000 ohms/square. The electrical-static dissipating primer 48 can be a carbon or graphite suspension such as Cabot VulcanXC® series water-based primer with surface conductivity of from 10,000 to 250,000 ohms/square. In some variations, the electrically-conductive film 48 can be a carbon-laced conductive polymer sheet such as CAPLINQ LINQSTAT XVCF series film with a surface conductivity of less than or equal to 1,000 ohms/square.

Figure 9B:
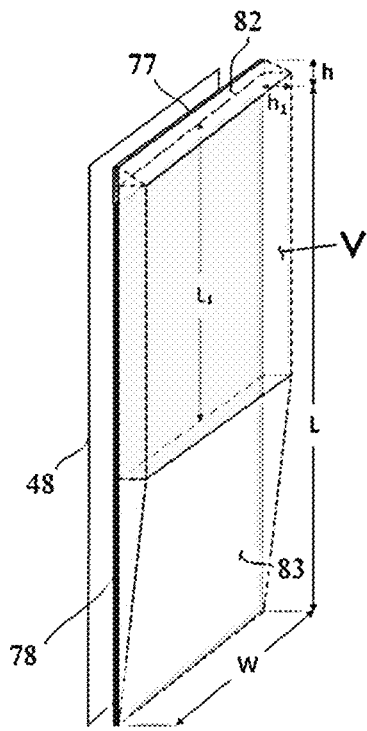
FIG. 9B depicts a simplified volume resistivity model of the FIG. 9A embodiment.

A simplified volume resistivity lumped-element model of the concrete substrate 15 is depicted in FIG. 9B, which represents the embodiment of FIG. 9A. Conductive coating 48 is also shown as part of this model. The improved waterproofing membrane 1 has a contact area on substrate 15 indicated by area 78, and the improved termination bar 38 has a contact area on substrate 15 indicated by area 77. The electrical-conduction channel through the volume of concrete in substrate 15 is represented by volume V, with length L1, width W, and height h1. Length L1 is the distance between the transverse planes normal to the center of contact area 77 and center of contact area 78. These transverse normally-oriented planes each have a width of W and a height of h1. It should also be noted that the width h of the improved termination bar 38 is also the height h1 of the electrical-conduction channel represented by volume V, because the contact area 77 of the improved termination bar 38 represents the most restrictive element in the electrical-conduction channel. Electrical current will flow between the contact surface area 78 of the improved waterproofing membrane 1 and the contact surface area 77 of the improved termination bar 38. Because of the distributed nature of the current flowing between these two areas, it is convenient to simplify the electrical current flow to the volume V, which represents the effective volume of area between the two contact surfaces 77 and 78, which in turn is constrained by the smaller contact area 77 of the improved termination bar 38. Conductive coating 48 has a covering measured by the formula W×(L+h).

Conventional concrete, consisting of hydrated Portland cement with silica sand as fine aggregate and lime-stone, stone, or other coarse aggregate, is a good electrical insulator when found in the kiln-dry condition, but acts more like a semiconductor when exposed to moisture. The electrical volume resistivity of conventional concrete generally ranges from about 6.54×10E5 to 11.4×10E5 ohm-cm for dried concrete and about 2.5×10E3 to 4.5×10E3 ohm-cm for moist concrete (see, e.g., Pye, et al, European Patent Specification EP 1268360B1, "Conductive Concrete Composition").

Pouillet's Law is used for calculating the path resistance of a volume resistivity:

$$R = \rho \frac{l}{A}$$

Where:
R is the path resistance in ohms;
p is the volume resistivity in ohms-cm;
l is the volume length in cm; and
A is the area in cm^2.

Figure 9C:
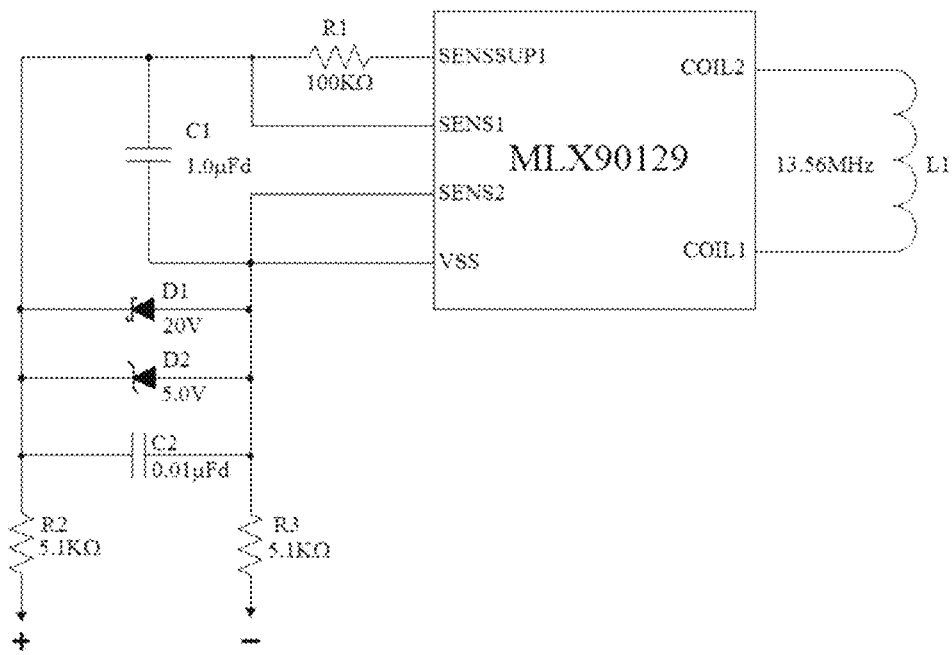
FIG. 9C depicts one embodiment of a simplified electronic schematic using an existing RFID sensor chip for an improved waterproofing system.
Figure 9D:
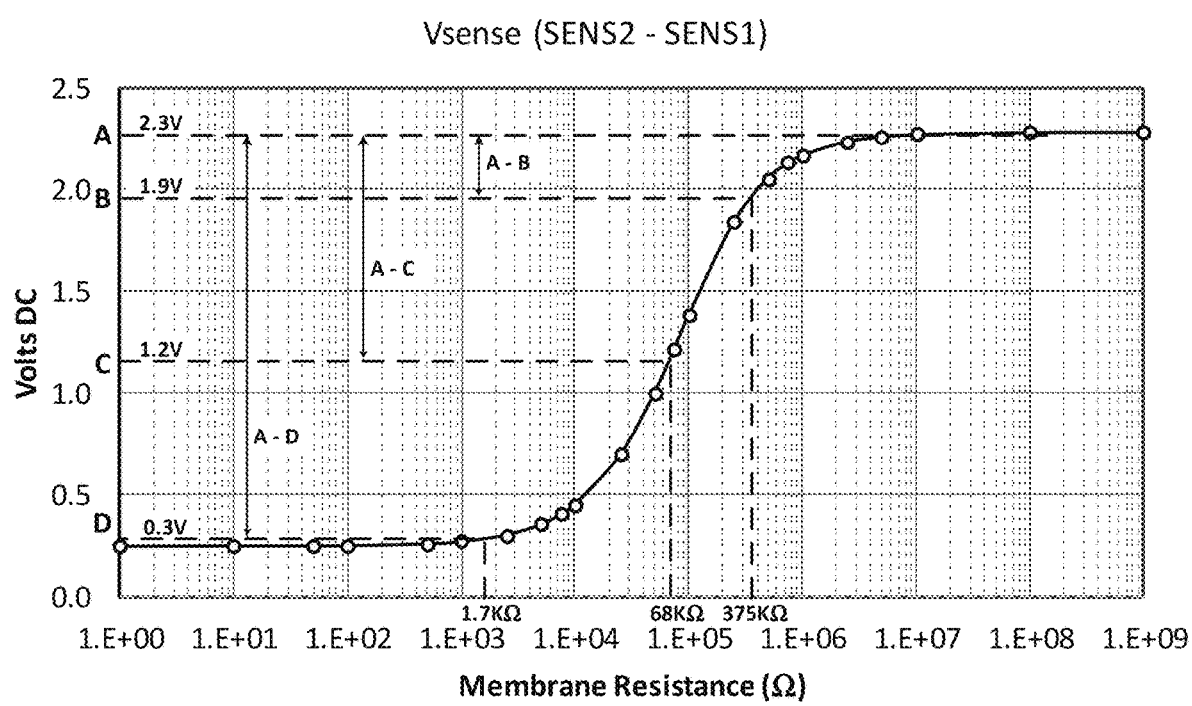
FIG. 9D depicts one embodiment of a graphical representation of the output response for simplified electronic schematic using an existing RFID sensor chip for the simplified electronic schematic circuit depicted in FIG. 9C, with voltage margins noted.
Figure 9E:
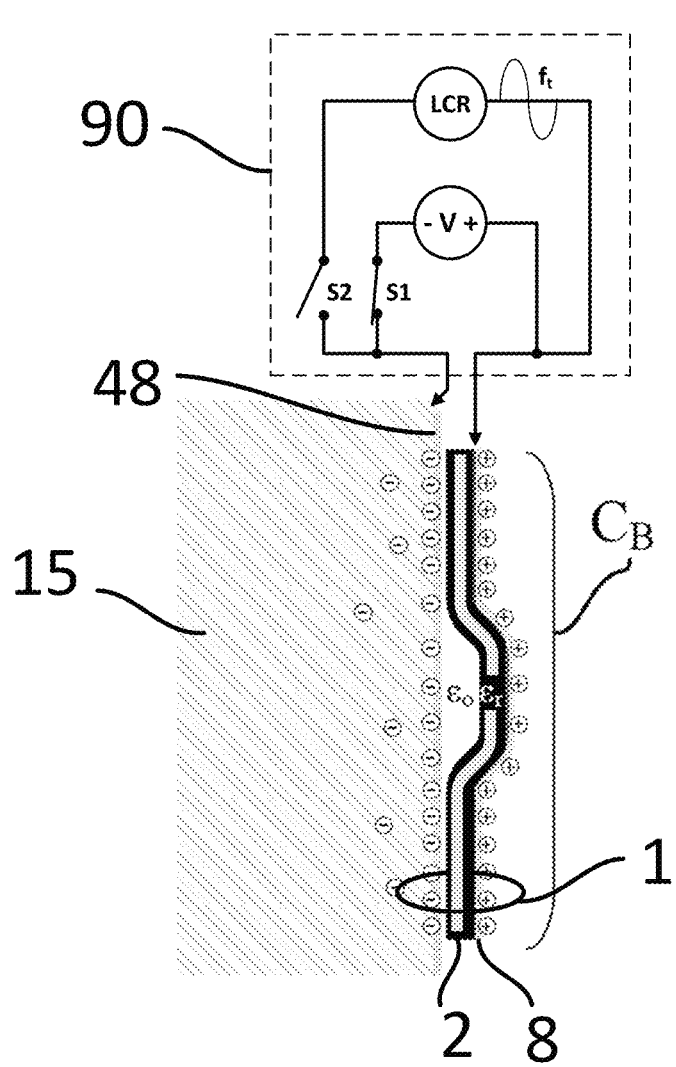
FIG. 9E depicts one embodiment of an abstract rendering of the installation verification of an improved waterproofing system using a capacitance measurement when there is a void between the waterproofing membrane and the concrete wall.
Figure 9F:
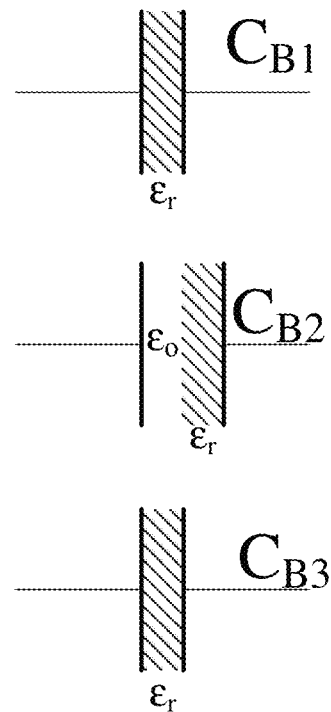
FIG. 9F depicts one embodiment of the equivalent capacitors of the configuration depicted in FIG. 9E.
Figure 9G:
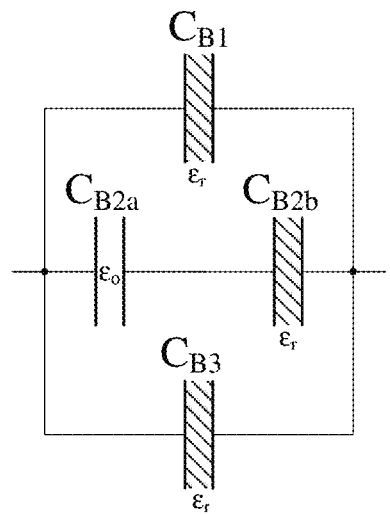
FIG. 9G depicts another embodiment of the equivalent capacitors of the configuration depicted in FIG. 9F.

In the case of the simple model depicted in FIG. 9B, ρ is the electrical volume resistivity of concrete as given above, l ranges from 152.82 cm to 153.25 cm (half of the length L of the improved waterproofing membrane 1 added to half of the height h of the improved termination bar 38), while A is the contact area 77 of the improved termination bar 38, which ranges from 464.52 cm$^2$ and 929.03 cm$^2$. Note that two example cases of height h, at 2 inches and at 4 inches, are given for the improved termination bar 38. For wet concrete, the FIG. 9B electrical-conduction channel resistance ranges from a best case 412 ohms for the 4-inch height h of improved termination bar 38 (and uses the 2.5×10E3 ohm-cm electrical resistivity for wet concrete) to a worst-case 375 Kohms for the 2-inch height h improved termination bar 38 (and uses the 11.4×10E5 ohm-cm electrical resistivity for dry concrete). These calculations are shown in Table 2 below. FIG. 9D shows that the electrical detection can range between 1×10E2 ohms and 1×10E7 ohms for the circuit configuration depicted in FIG. 9C, and even with the worst-case 375 Kohms of bias resistance from the driest concrete resistivity, the detection circuit will still have approximately 400 mV of measurement margin in which to detect water infiltration through the improved waterproofing membrane 1, as indicted by 2.3 VDC at Line A minus 1.9 VDC at Line B (i.e., 2.3 VDC-1.9 VDC=400 mV).

If conductive coating 48 with a surface conductivity of 50,000 ohms/square is factored into the calculation, then a resistance of 50×10E3 ohms (for the W×W square)+50×10E3 ohms×⅔ (for the W×2W/3 square)=(50×10E3+33.33×10E3) ohms=83.3 Kohms, will appear in parallel with the worst-case 375 Kohms path resistance from the driest concrete wall. The net resistance Rnet would then be reduced to:

Rnet=1/((1/375 Kohms)+(1/83.3 Kohms))=68.16 Kohms

The detection circuit will now have approximately 1.1 V of measurement margin in which to detect water infiltration through the improved waterproofing membrane 1, as indicated by 2.3 VDC at Line A minus 1.2 VDC at Line C (i.e., 2.3 VDC-1.2 VDC=1.1 VDC).

If conductive coating 48 with a surface conductivity of 1,000 ohms/square is factored into the calculation, then a resistance of 1×10E3 ohms (for the W×W square)+1×10E3 ohms×⅔ (for the W×2W/3 square)=(1×10E3+667) ohms=1.67 Kohms, will appear in parallel with the worst-case 375 Kohms path resistance from the driest concrete wall. The net resistance Rnet would then be reduced to:

Rnet=1/((1/375 Kohms)+(1/1.67 Kohms))=1.66 Kohms

The detection circuit will now have approximately 2V of measurement margin in which to detect water infiltration through the improved waterproofing membrane 1, as indicated by 2.3 VDC at Line A minus 0.3 VDC at Line D (i.e., 2.3 VDC-0.3 VDC=2.0 VDC).

The volume resistivity of moist concrete can be very low (between 2.5×10E3 and 4.5×10E3 ohm-cm), because of the agorascopic nature (quickly absorbs and slowly releases moisture) of cured concrete, in combination with its mineral properties (calcium oxides or hydroxides, chlorides, and other ions from ground water), which provides a ready supply of mobile ions within the concrete to conduct electrical current (see, e.g., O. Sengul and O. E. Gjorv, "Electrical Resistivity Measurements for Quality Control During Concrete Construction," ACI Materials Journal, Vol. 105, no. M61, pp. 541-547, 2008).

TABLE 2

Volume Resistivity for FIG. 9B Concrete Conduction Channel

| | Path Resistance (ohm) | Concrete Volume Resistivity (ohm-cm)* | Contact Area 77 Aterm (cm^2) | Conduction Channel L1 (cm) | Membrane Length L (ft) | Termination Bar Contact Area 77 | | | |
|---|---|---|---|---|---|---|---|---|---|
| | | | | | | Area (ft^2) | Area (in^2) | Width W (ft) | Height h(in) = h1(in) |
| Wet Concrete | 7.42E+02 | 4.50E+03 | 929.03 | 153.25 | 10 | 1.0 | 144 | 3 | 4 a 3 ft × 4" term bar contact area |
| | 4.12E+02 | 2.50E+03 | | | | | | | |
| | 1.48E+03 | 4.50E+03 | 464.52 | 152.82 | 10 | 0.5 | 72 | 3 | 2 a 3 ft × 2" term bar contact area |
| | 8.22E+02 | 2.50E+03 | | | | | | | |
| | | ~412 ohm to 1.48 Kohm | | | | | | | |
| Dry Concrete | 1.88E+05 | 1.14E+06 | 929.03 | 153.25 | 10 | 1.0 | 144 | 3 | 4 a 3 ft × 4" term bar contact area |
| | 1.08E+05 | 6.54E+05 | | | | | | | |
| | 3.75E+05 | 1.14E+06 | 464.52 | 152.82 | 10 | 0.5 | 72 | 3 | 2 a 3 ft × 2" term bar contact area |
| | 2.15E+05 | 6.54E+05 | | | | | | | |
| | | ~108 Kohm to 375 Kohm | | | | | | | |

*EP 126836081 EUROPEAN PATENT SPECIFICATION. CONDUCTIVE CONRETE COMPOSITION

Figure 10A:
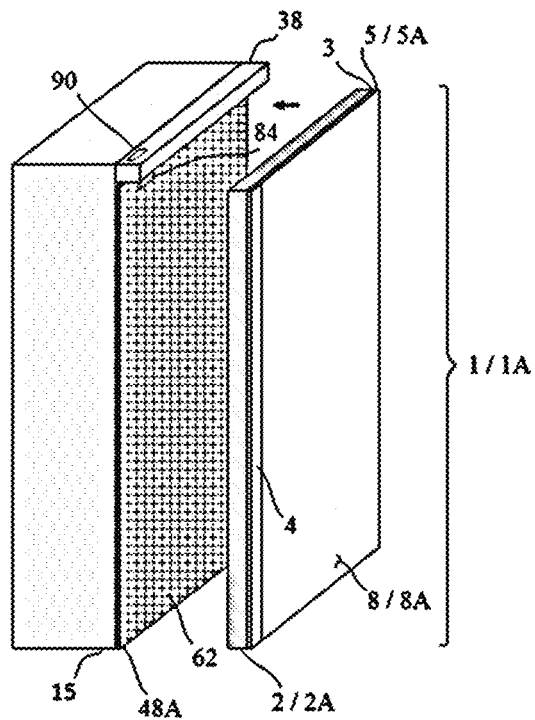
FIG. 10A depicts one embodiment for application of the improved waterproofing membranes of FIG. 2A and FIG. 2B to a vertical precast concrete wall.

FIG. 10A depicts another embodiment of a below-grade installation of improved waterproofing membrane 1 or bentonite waterproofing membrane 1A, with electrically-conductive fold-over flap 4, under an improved termination bar 38, and with electrical-contact feature 84 and an electronic-readout device 90 with an electrically-conductive mesh 62 applied to the building substrate 15 using concrete primer 48A. The electrically-conductive mesh 62 has an aperture (mesh opening) optimized to let the asphaltic membrane 2 material flow though and contact the substrate 15 so as not to compromise or degrade the adhesive bond. A typical aperture opening size can be, but is not limited to, a square shape approximately ½" to 1" between mesh elements. The mesh elements can be comprised of a fine metal or a metalized flexible material such as polyethylene terephthalate (PET) or a polymer such as low-density polyethylene (LDPE) or high-density polyethylene (HDPE). If used, the PET or polymer coating process is performed either through VMD or mechanical rolling (gravure). The electrical conductivity of the mesh 62 should be less than or equal to 5 ohms/square (especially for bentonite membranes), though for asphaltic membranes, up to 1000 ohms/square can work, though less effective. The electrically-conductive mesh 62 enhances the performance of the installation-verification method by capacitive coupling as described in FIGS. 9E, 9F, and 9G. Metalized PET or polymer mesh is generally preferred over the metal mesh because the metalized PET or polymer mesh will not mechanically cut through the asphaltic membrane 2 under thermal cycling and/or from mechanical vibration and shock. The electrically-conductive mesh 62 also potentially enhances reading Mode 2 electrical measurements made to the bentonite layer 2A as described for FIG. 8.

Figure 10B:
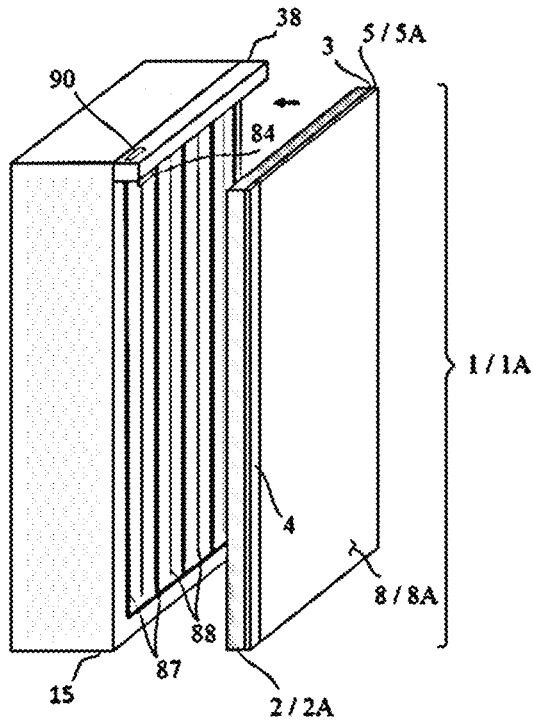
FIG. 10B depicts an alternate embodiment for application of the improved waterproofing membranes of FIG. 2A and FIG. 2B to a vertical precast concrete wall.
Figure 10C:
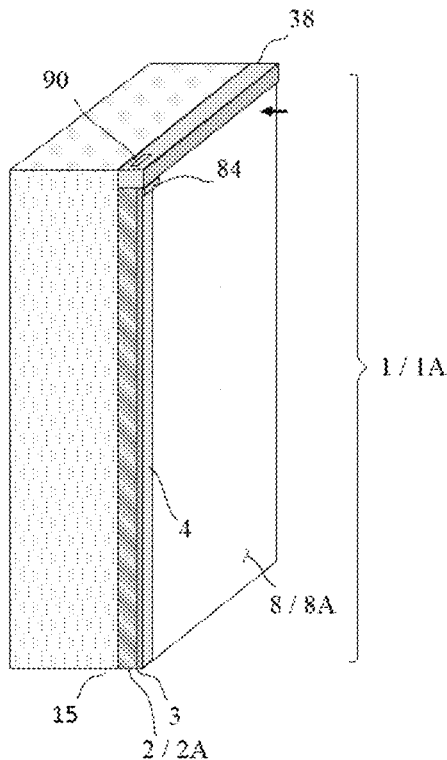
FIG. 10C depicts one embodiment for application of the improved waterproofing membranes of any of FIG. 9A, FIG. 10A, or FIG. 10B to a vertical precast concrete wall.

FIG. 10B depicts another embodiment of a below-grade installation of improved waterproofing membrane 1 or bentonite waterproofing panel 1A, with electrically-conductive fold-over flap 4, under an improved termination bar 38, with electrical-contact feature 84 and an electronic-readout device 90 with an auxiliary detection grid 87, 88 formed by electrical-sensing elements one 87 and two 88 applied to the building substrate 15. The auxiliary detection grid elements 87 and 88 can be made from a self-sticking metalized flexible film material such as PET that is typically delivered to an installation jobsite in roll form with a paper or polymer release liner that is removed to expose the self-sticking adhesive film backing. The PET metallization-coating process is either performed through VMD or mechanical rolling (gravure), using a masking layer to create the auxiliary grid pattern of sensing element pairs 87 and 88. In variations, the auxiliary grid pattern of sensing element pairs 87 and 88 can also be printed using conductive ink such as Loctite® ECI line of conductive inks and coatings. The auxiliary-detection grid formed by electrical-sensing elements one 87 and two 88 allows for the presence of moisture to be detected between the structural substrate 15 and either the proximal surface of the asphaltic membrane 2 or the proximal surface of bentonite layer 2A, without the presence of a water-leakage breach in the actual improved waterproofing membrane 1 or 1A. This auxiliary-detection mode is useful to sense the progression of moisture behind the improved waterproofing membrane 1, 1A from a breached waterproofing panel somewhere else in the waterproofing installation. The breached waterproofing panel itself also provides indication of the location where the water leakage initially occurred. It should be noted that the auxiliary-detection mode can also be used on a waterproofing installation made from current-art non-improved asphaltic waterproofing membranes that are currently available on the market, or made from current-art non-improved bentonite waterproofing panels currently available on the market in Configurations 1, 2, and 3 as described in the Background section, supra, in order to provide these standard waterproofing systems with non-intrinsic leak-detection capability.

Fluid-Applied Membranes with Intrinsic Leak Detection

In addition to membrane-applied or sheet-applied waterproofing barriers, there are also fluid-applied barriers/membranes (that is, pre-applied to the structural substrate, such as a concrete) used in the building-construction industry for below-grade applications.

Figure 11A:
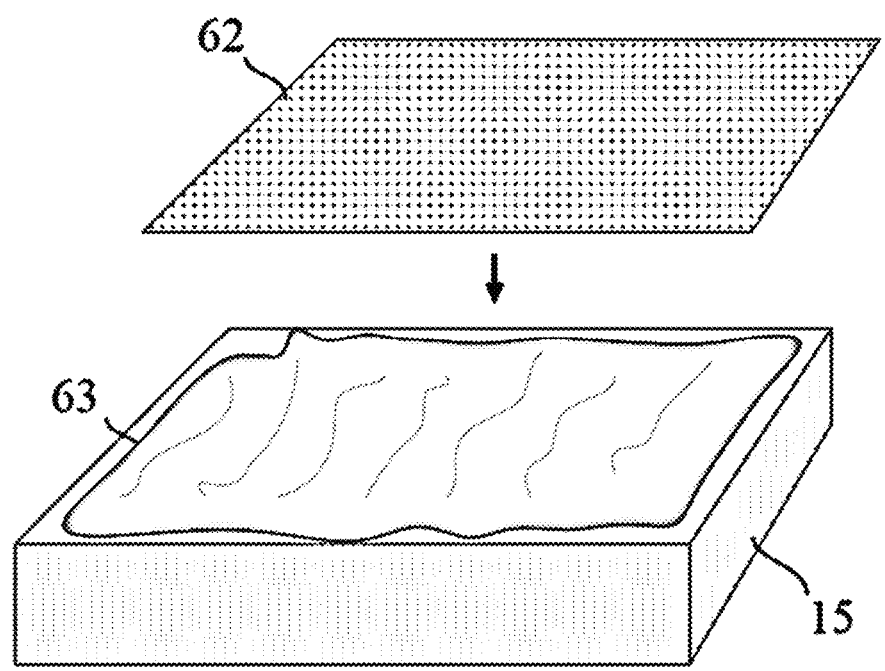
FIG. 11A depicts one embodiment for an improved fluid-based waterproofing membrane with electrical leak-detection capability.
Figure 11B:
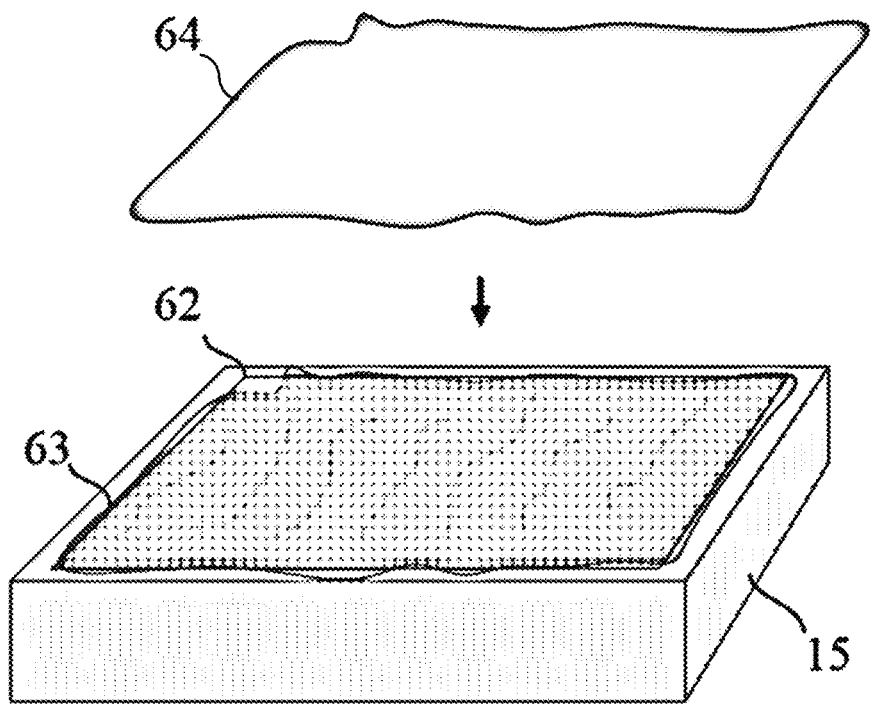
FIG. 11B depicts one embodiment for an improved fluid-based waterproofing membrane of FIG. 11A with electrical leak-detection capability.
Figure 11C:
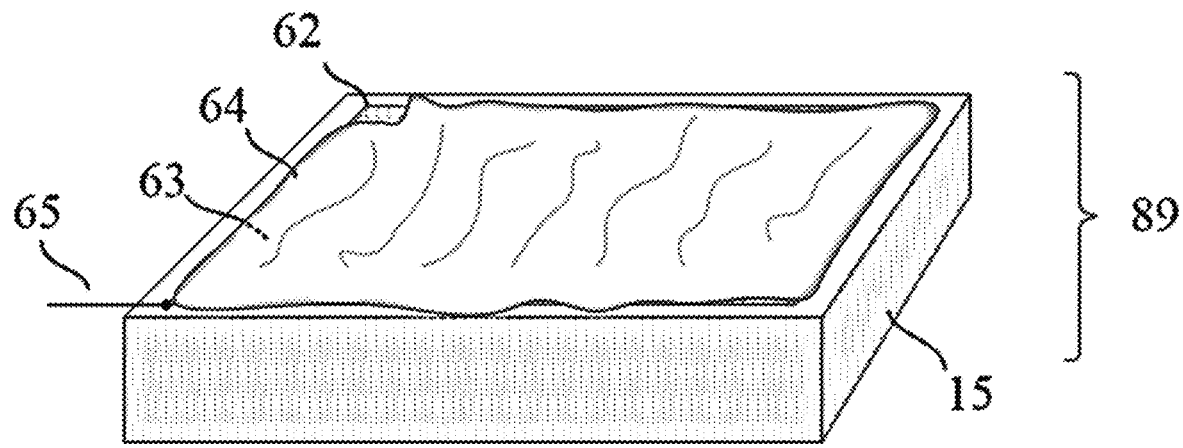
FIG. 11C depicts one embodiment for a fully constructed improved fluid-based waterproofing membrane of FIG. 11B.

FIGS. 11A, 11B, and 11C depict an embodiment for how intrinsic leak-detection capability can be added to a fluid-applied waterproofing membrane 63 and 64, by using an electrically-conductive mesh 62, without the need to use a drain panel modified with a built-in electrically-conductive layer on its proximal side. The result is an improved composite fluid-applied membrane 89.

A standard state-of-the-art commercially-available fluid-applied membrane 63 is applied to a horizontal or vertical structural substrate 15. Generally, a membrane 63 and 64 of this type may be either hot or cold spray-applied or hot or cold roll-applied liquid. Current-art fluid-applied waterproofing membranes are described below.

Cold-applied membranes may be composed of a high-solids polyurethane such as: Tremco Inc. TREMproof® 201/60, TREMproof® 250GC, an asphalt emulsion such as TREMproof® 260, a thermoplastic such as Polyguard Products Inc. Polyguard PRO3101®, or similar products that are designed to apply a waterproof coating in cold-liquid form.

Hot-applied membranes may be composed of 100%-solids hot rubberized asphalt such as: Tremco Inc. TREMproof® 6100, TREMproof® 6100BM, TREMproof® 6145, or similar products that are designed to apply a waterproof coating in hot-liquid form.

After the fluid-applied membrane 63 has been applied to the substrate 15, an electrically-conductive mesh 62, in sheet or rolled form, is applied to the fluid-applied membrane 63. The electrically-conductive mesh 62 has an aperture (mesh opening) optimized to let the uncured fluid-applied membrane 63 material flow though, yet not compromise the conductive electrical characteristics of the mesh. A typical aperture opening size may be, but not limited to, a square shape approximately ½" to 1" between mesh elements. The mesh elements can be comprised of a fine metal or a metalized flexible material such as polyethylene terephthalate (PET) or a polymer such as low-density polyethylene (LDPE) or high-density polyethylene (HDPE). If used, the PET or polymer coating process is performed either through VMD or mechanical rolling (gravure). The average electrical conductivity of the mesh 62 should be less than or equal to 5 ohms/square. The metalized PET or polymer mesh is preferred over the metal mesh because the metalized PET or polymer mesh will not mechanically cut through the fluid-applied membrane 63 and 64 under thermal cycling and/or from mechanical vibration and shock.

A second layer of commercially-available standard current-art fluid-applied membrane 64 is applied over the initial fluid-applied membrane 63 that has been already applied to the substrate 15, with electrically-conductive mesh 62 embedded in the initial fluid-applied membrane 63 material. The second layer of commercially-available standard current-art fluid-applied membrane 64 is shown applied over the initial fluid-applied membrane 63 with embedded electrically-conductive mesh 62. A single electrical connection 65 can be made to the embedded electrically-conductive mesh 62 in a convenient location to allow the electrical properties of the improved composite fluid-applied membrane 89 to be read using an external electronic read-out device 90.

Above-Grade Membranes with Intrinsic Leak Detection

Figures 12A, 12B:
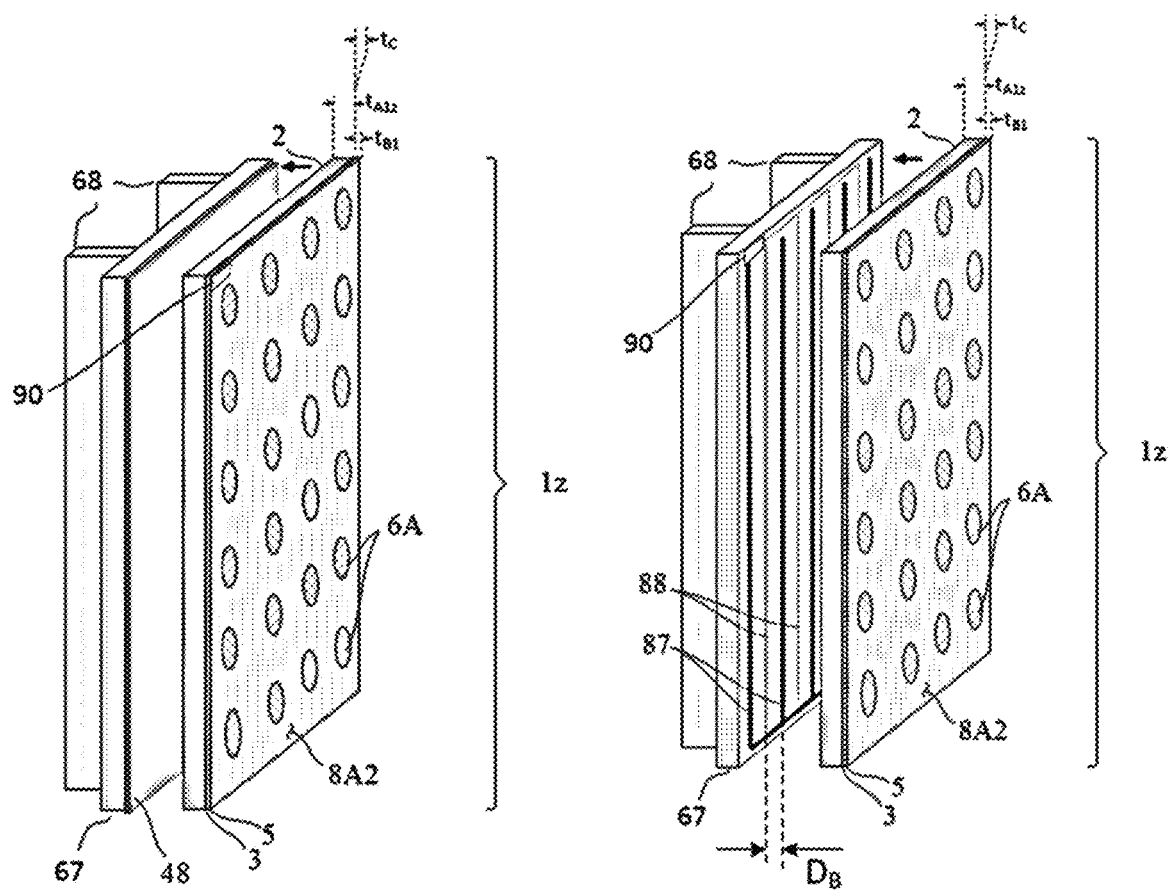
FIG. 12A depicts an embodiment of an improved waterproofing membrane of FIG. 2A when used as an air-barrier on a non-conductive above-grade wall.
FIG. 12B depicts an alternate embodiment of an improved waterproofing membrane being installed on a non-conductive substrate material with support members in a vertical wall above-grade air-barrier with electronic readout device, and featuring an auxiliary detection grid formed by electrical-sensing elements applied to the non-conducting substrate.
Figure 13:
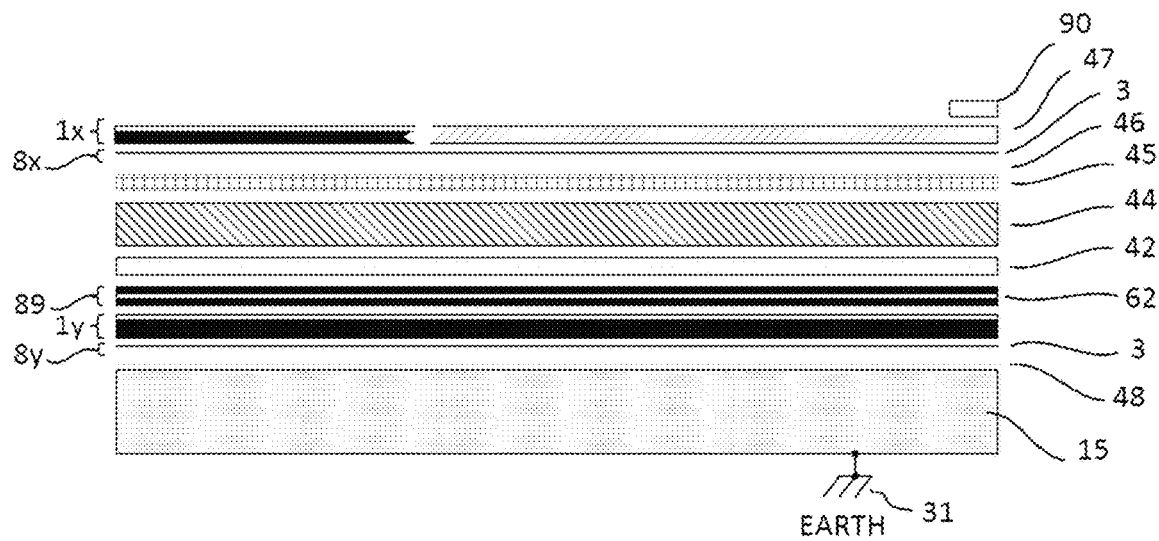
FIG. 13 depicts one embodiment for application of the improved polymer backing membrane of FIG. 1A, the improved waterproofing membrane of FIG. 2A, and the improved composite fluid-applied membrane of FIG. 11C in order to a built-up a horizontal roofing system or plaza-deck system.

Refer to FIGS. 12A and 12B, which depict several embodiments of above-grade vertical installations of improved waterproofing membrane 1 in air barrier applications, and FIG. 13, which depicts embodiments for a horizontal installation of improved waterproofing membrane 1 or improved fluid-applied waterproofing membrane 89 or improved polymer backing membrane 8 or combinations of both 1, 8, 89 installed for flat roofing, plaza decks, or deck-coating applications. One or more or all the membrane configurations can be used to provide the roofing system or deck coating system with intrinsic leak-detection capability. As examples, some of the current-art air-barrier systems on the market include Henry Company Blueskin® line of self-adhered, water-resistive, air and vapor barriers and the Tremco® ExoAir® line of air-barrier systems.

FIG. 12A depicts an embodiment of an improved waterproofing membrane 1z being installed on a non-conductive substrate material 67 with support members 68 in a vertical wall above-grade air-barrier with electronic readout device 90. Surface-preparation compound or material 48, in this case a conductive underlying material as described for FIG. 9A, is placed on the non-conductive substrate, and the improved waterproofing membrane 1z is installed over this. The conductive underlayment 48 is necessary for the intrinsic leak-detection capability to electronically function, as it allows the electrical leakage current between the electrically-conducting layer 3 and the conductive underlayment 48 to be continuously monitored by the electronic-readout device 90. The improved waterproofing membrane 1z is identical to the improved waterproofing membrane 1, except that the thickness $t_{A1z}$ of the asphaltic membrane is nominally 40 mils, and there are safe-to-fasten indications 6A on the distal surface of the improved backing membrane 8A2, which align with openings in the electrically-conductive layer 3, in the same way that the safe-to-fasten indications 6 aligned with openings 7 in the electrically-conductive layer 3 of the improved backing layer 8A depicted in FIGS. 1B and 2B. These are necessary to allow the improved waterproofing membrane 1z to be mechanically fastened to the substrate in an air-barrier application.

FIG. 12B depicts another embodiment of an improved waterproofing membrane 1z being installed on a non-conductive substrate material 67 with support members 68 in a vertical wall above-grade air-barrier with electronic-readout device 90, and an auxiliary detection grid formed by electrical sensing elements one 87 and two 88 applied to the non-conducting substrate 67. The auxiliary detection grid elements 87, 88 can be made from a self-sticking metalized flexible film material such as polyethylene terephthalate (PET) that is delivered to an installation jobsite in roll-form with a paper or polymer release liner that is removed to expose the self-sticking adhesive film backing. The PET metallization-coating process is performed either through VMD or mechanical rolling (gravure), using a masking layer to create the auxiliary grid pattern of sensing element pairs 87 and 88. The auxiliary grid pattern of sensing element pairs 87 and 88 can also be printed using conductive ink such as Loctite® ECI line of conductive inks and coatings. The auxiliary detection grid formed by electrical-sensing elements one 87 and two 88 allows the presence of moisture to be detected between the non-conducting structural substrate 67, and the proximal surface of the asphaltic membrane 2. This auxiliary detection mode is useful to sense the progression of moisture behind improved waterproofing membrane 1 from a breached waterproofing membrane somewhere else in the waterproofing installation. The breached waterproofing membrane itself also provides indication of the location where the water leakage initially occurred. It should be noted that the auxiliary-detection mode can also be used on a waterproofing installation made from current-art non-improved air-barrier asphaltic waterproofing membranes currently available on the market, in order to provide these standard air-barrier systems with non-intrinsic leak-detection capability.

FIG. 13 depicts embodiments in a cross-sectional view of a notional horizontal above-grade horizontal decking or plaza waterproofing or built-up roofing or modified bitumen roofing applications, where an improved asphaltic waterproofing membrane 1 with electrically-conductive layer 3, or improved composite fluid-applied membrane 89, or improved polymer backing membrane 8 could be applied. The FIG. 13 above-grade deck plaza or horizontal roof depiction is shown illustrated partially exploded, where the components have been separated from each other for better clarity. The various layers are described below in order, moving up from the substrate 15 towards the outer cladding layer 47. Some of the built-up roofing, modified bitumen and plaza-deck coating systems on the market include the IKO BUR built-up roofing system, the IKO Torchflex® hot-applied and composite roofing systems, the IKO Modiflex® ColdGold® cold-applied roofing system, the Tremco® Puma® line of deck coatings and sealants, the Tremco® BURmastic cold-applied roofing systems, the THERMastic® hot-applied built-up roofing systems, and the POWERply® line of modified bitumen roofing systems.

The improved polymer backing membrane 8 and/or improved waterproofing membrane 1, each with an electrically-conductive layer 3, are applied to the structural substrate 15 using a surface preparation compound such as primer 48. The underlying improved polymer backing membrane 8 can serve both as a protective layer for the first improved waterproofing membrane 1 as well as an electrical-conduction path for the leak-detection mechanism of the first improved waterproofing membrane 1. In some embodiments, the primer 48 can be electrically conductive as previously described for FIG. 9A. An additional waterproofing layer such as improved composite fluid-applied membrane 89 with conductive mesh 62, or simply a non-improved state-of-the art sheet or fluid-applied bitumen (asphaltic) membrane, can be placed over the first improved waterproofing membrane 1. Additionally, in other variations, the waterproofing membrane materials can be a rubberized asphalt, a thermoplastic such as urethane, or any suitable plastic material that exhibits the desirable properties of impermeability to moisture, chemical stability/compatibility with the other materials within this system, and superior resistance to rot, decay, and organic contamination (e.g., mold, fungus and mildew). A protective layer 42 can be placed above the additional waterproofing membrane layer 89, and above this, an insulating layer 44. The protection layer 42 is typically a geocomposite board or other material that can be used protect the additional waterproofing membrane 89 from damage during construction. The insulating layer 44 is typically high-compression-strength extruded polystyrene that can be used to provide both thermal and acoustic insulation. The drainage board 45 provides water runoff capacity to prevent any water that finds its way past the outer cladding surface from building up on the horizontal surface of the insulating board 44. A filter layer 46 provides protection from particle and dirt infiltration into the system. The drainage panel 45 is typically a geocomposite dimple board with high-compressive-strength properties (that is, greater than or equal to 15,000 psi). The filter layer 46 is typically a geotextile material made from non-woven polypropylene. All these materials are designed to be impervious to fungus and other organic forms of attack and degradation (e.g., mold, fungus and mildew).

Another improved polymer backing membrane 8 may be placed above the filter fabric layer 46 in order to provide an electrically-conductive layer 3 that can be used to detect water leakage from the outer layer 47 using low-voltage Electrical Field Vector Mapping (EFVM) or similar externally-applied low-voltage methods. Note that for EFVM (which provides only discrete leakage check capability for the initial quality-control install-verification, or for periodic verification, or for forensic leak-location capability after a membrane has been breached), the electrically-conductive layer 3 of the plurality of improved polymer backing membranes 89 used in the roofing system must all be connected electrically to the substrate 15 earth-ground 31. The outer layer 47 can be an external paving or tile system for decks, a poured-concrete plaza deck, or may even be a "green" application with soil and living plant life such as grass for plazas and terraces. For roofing applications, the outer layer 47 can take the form of another improved waterproofing membrane 1. The electrical leak-detection can be used to continuously monitor several layers of the installation, such as:

- Between the outer layer improved waterproofing membrane 1$x$ and the underlying upper improved polymer backing membrane 8$x$ to provide immediate indication that the outer roofing layer 47 is breached; note that this detection scheme not only provides the same installation verification as EFVM, but also allows for continuous monitoring of the system over the life of the installation; or
- Between the upper improved polymer backing membrane 8$x$ and the lower improved waterproofing membranes (either 89 or 1$y$) to provide indication that the upper layers of a roofing or plaza deck system have been compromised; or
- Between the lower improved waterproofing membranes (either 89 or 1$y$) and the lower improved polymer backing membrane 8$y$ to provide indication that the lower layers of a roofing or plaza deck system have been compromised; or
- Between the upper improved polymer backing membrane 8$x$ and the lower improved polymer backing membrane 8$y$ to provide indication the that all layers of a roofing or plaza deck system have been compromised; or
- Between the lower improved polymer backing membrane 8$y$ and substrate 15 electrical earth-ground 31 to provide indication that water has infiltrated all the way to the substrate; or
- Between any combination of the various layers within an installation.

The above-bulleted detection schemes are provided as examples only, and the placement and selection of intermediate layers 3 to 47 are provided here merely as an example of a built-up roofing system or modified bitumen deck plaza application. The architectural specification for each installation will precisely define if and where the various layers are to be placed, how the various layers are to be configured, and what leak-detection scheme will be employed. This example is provided to show that the improved composite waterproofing membrane 1, the improved composite fluid-applied membrane 89, and the improved polymer backing membrane 8 can be used in many different combinations to provide different horizontal above-grade applications with continuous intrinsic electronic leak-detection capability. The electronic-readout device or devices 90 for each layer with intrinsic leak-detection capability, shown notionally here, are placed either directly below the upper-most layer (1$x$ or 47) or directly above upper-most layer (1$x$ or 47) in an encapsulated and protected flat package several mils in thickness (approximately equivalent to a credit card in size and thickness).

Enhancing Single-Ply Roofing Systems with Leak Detection

Figure 14:
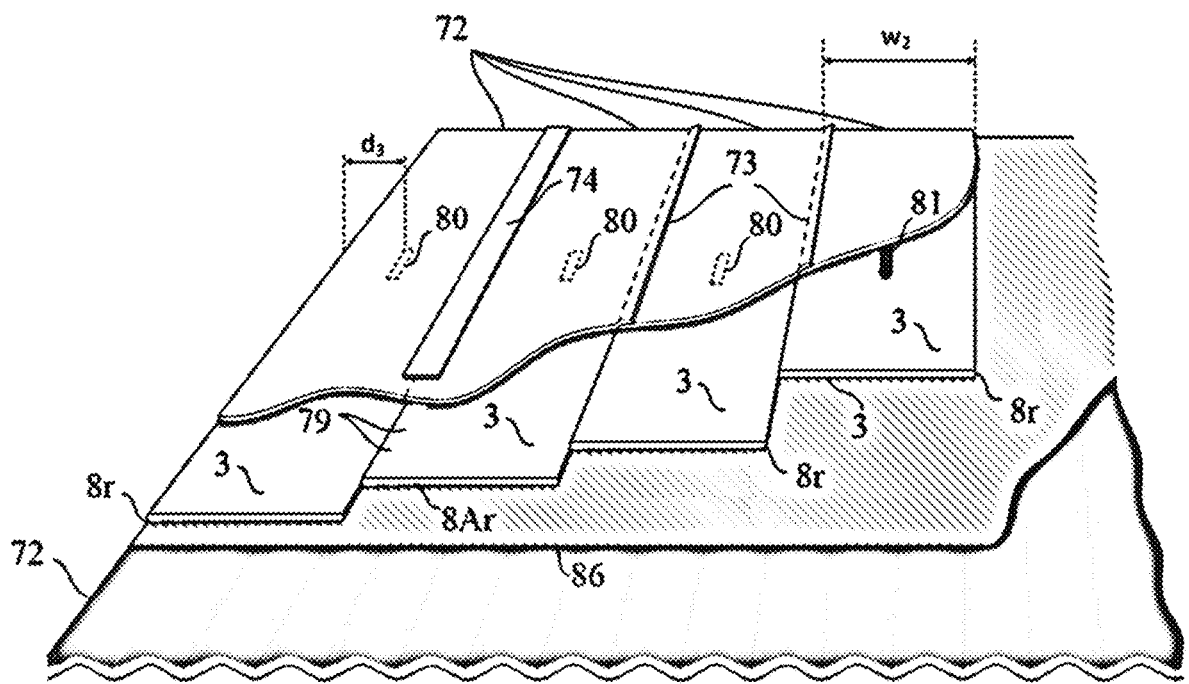
FIG. 14 depicts two different embodiments for application of the improved metalized backing membrane of FIG. 1A or FIG. 1B to a single-ply roofing system.

FIG. 14 depicts embodiments of an isometric view a notional single-ply roofing application, wherein the improved polymer backing membranes 8$r$, 8Ar with electrically-conductive layer 3, are installed immediately below the single-ply roofing membrane 72. In this case, the improved polymer backing membranes 8$r$, 8Ar are modified to be made from polypropylene (PP), and to have a different high-density polyethylene (HDPE) gauge thickness that ranges between 4 and 20 mils, depending on the application. In addition, there are no fold-over features as in other embodiments discussed above. The improved polymer backing membrane 8$r$ has a continuous electrically-conductive layer 3, while the improved polymer backing membrane 8Ar has a continuous electrically-conductive layer 3 with openings 79 designed to allow mechanical fasteners to pass through without disrupting the electrically-conductive layer 3. The electrically-conductive layer 3 can be composed of either VMD metallization, a discrete metalized polyethylene terephthalate (PET), or metalized polymer film. As stated previously, the VMD metallization represents a preferred embodiment for adding the electrically-conductive layer. There is also a conductive underlayment layer 86 installed above the roofing substrate 72. The conductive underlayment 86 can be a primer with a carbon or graphite suspension, such as, for example, Detec Systems® Inc. Tru-Ground® primer with a surface conductivity less than or equal to 10,000 ohms/square. In variations, the conductive underlayment 86 can be an electrical-static-dissipating primer, such as, for example, a carbon or graphite suspension as found in the Cabot VulcanXC® series water-based primer with surface conductivity of between 10,000 and 250,000 ohms/square, or can be an electrically-conductive film that is carbon-laced such as, for example, CAPLINQ LINQSTAT XVCF series film with a surface conductivity of less than or equal to 1,000 ohms/square. The conductive underlayer 86 can also take the form of an electrically conductive mesh 62, as described for FIGS. 11A through 11C. The aperture (mech opening) is not as critical since no fluid materials need to pass-through the mesh opening. However, similar aperture-opening shapes and sizes can be, but are not limited to, a square shape of approximately ½" to 1" between mesh elements. The mesh elements are comprised of a metalized polyethylene terephthalate (PET) or a polymer such as polypropylene (PP). If used, then the PET or polymer-coating process is performed via VMD or mechanical rolling (gravure). The average electrical conductivity of the mesh 62 should be less than or equal to 15 ohms/square. Metal meshes are not allowed by some roofing membrane manufacturers because of the risk of abrading the soft membrane materials under mechanical loading (e.g., thermal cycling, vibration, and shock); therefore, the soft metalized polymer offers a potential substitute for conductive primers or metal mash intended to facilitate low-voltage leak-detection methods such as EFVM on conventional non-improved roofing installations.

The improved polymer backing membranes 8r, 8Ar have the same width dimension w2 as the single-ply roofing membrane 72, and during installation, the underlying improved polymer backing membranes 8r, 8Ar are aligned transversely with the single-ply roofing membrane 72. The wireless electrical-leak detection transceivers 80, 81 (shown exposed) are placed immediately below the single-ply roofing membrane 72 located at the center of the longitudinal axis of the single-ply roofing membranes 72 at dimension d3 from the longitudinal edges of the two sets of membranes 72 and 8r or 8Ar (note that d3 is one-half of w2) using an electrically conductive adhesive such as, for example, Permabond® 820, with an electrical conductivity of greater than or equal to 1×10E7 (1/ohm/m), a dielectric strength of 25 kV/mm, and a service temperature range of −55° C. to +200° C. (−65° F. to +390° F.). This ensures that the wireless electrical-leak detection transceivers 80, 81 are as far as possible from the single-ply membrane 72 weld seams 73 that are created during roofing installation, or from the seam covers 74 that are heat-cured during roofing installation. The wireless electrical-leak detection transceivers 80, 81 sense the electrical-displacement current flowing between the improved polymer backing membranes 8r, 8Ar conductive layer 3 and the conductive underlayment layer 86. Any leakage through the single-ply roofing membrane 72 alters the impedance between the conductive layer 3 and the conductive underlayment layer 86, thereby altering the electrical-displacement current measured by the wireless electrical-leak detection transceivers 80, 81. Current-art, commercially available, single-ply, roofing-membrane systems include the Tremco® TremPly® TPA and TPO (Thermoplastic Polyolefins) lines and KEE (Keytone Ethylene Ester) line. For the Tremco single-ply systems, roofing membranes have a width w2 dimensions of 78 inches 120 inches.

Considerations for the environmental conditions that the wireless electrical-leak-detection transceivers 80, 81 will be subjected to in roofing applications have been made. The transceiver's electronic chips have an automotive-grade-temperature operating range between −40° C. and +125° C. (−40° F. and +257° F.) and a non-operating-temperature range between −65° C. and +150° C. (−85° F. and +302° F.). Because the wireless electrical-leak-detection transceivers 80, 81 are passive RFID devices, they only operate for approximately 10 to 50 msec when a reading request is sent to initiate measurement of the electrical-displacement current between the improved polymer membrane 8r, 8Ar electrically-conductive layer 3 and conductive underlayment 86. The chips also have a lead-temperature absolute maximum rating of +260° C. (500° F.) for 10 seconds, which normally occurs during wave soldering of the chips to circuit boards during production. The 10-second maximum rating also serves to protect the wireless electrical-leak-detection transceivers 80, 81 during the heat-welding and heat-curing operations that occur during roof installation. Thermal surveys of roofing, under worse-case conditions, have shown that roofing reaches temperatures of up to +170° F. (∼+77° C.) from solar heating (see, e.g., Winandy, et al., "Roof Temperatures in Simulated Attics, US Department of Agriculture, Forest Service Laboratory Research Paper, September 1995.)

Figure 15A:
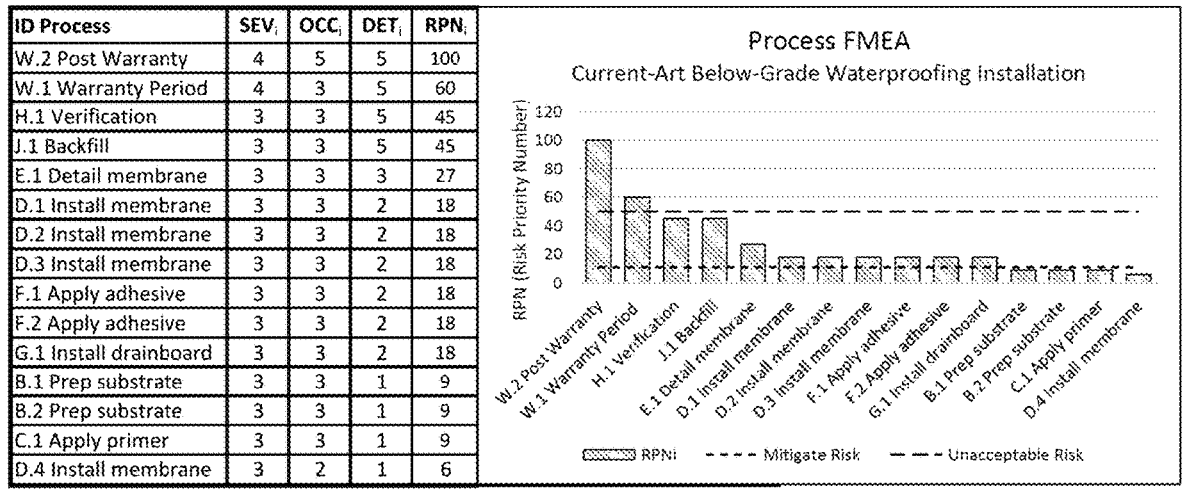
FIG. 15A depicts the current-art initial process-risk assessments for each identified potential failure mode, with the assessments being graded from highest to lowest.
Figure 15B:
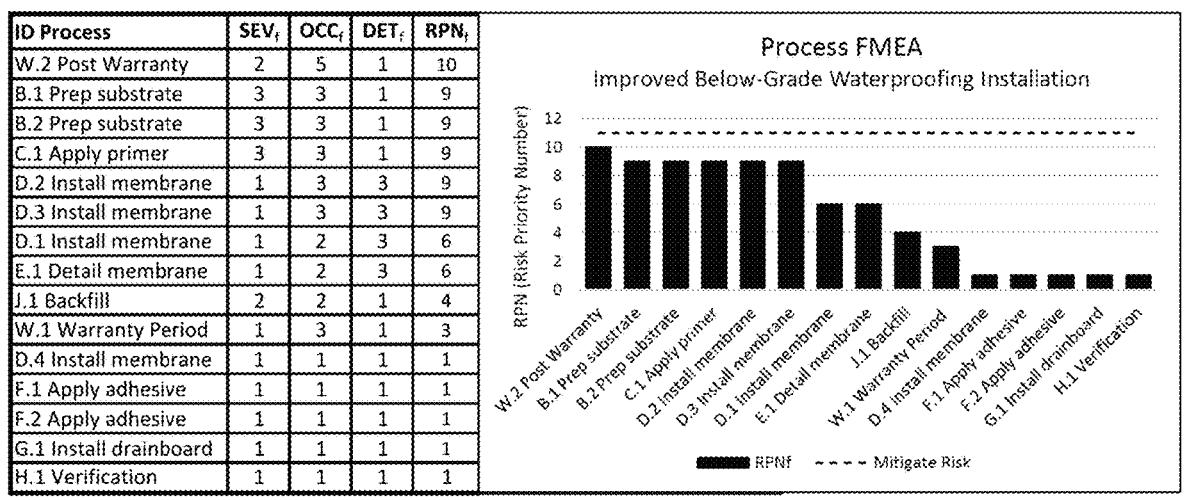
FIG. 15B depicts one embodiment of the initial process-risk assessments for each identified potential failure mode for an improved waterproofing system manufacturing and installation process, with the assessments being graded from highest to lowest.

IV. Failure Mode and Effects Assessment (FMEA) for the Manufacturing and Installing an Improved Building Foundation Waterproofing and Drainage System with Intrinsic Leak Detection Capabilities This Section IV is directed to the FMEA risk assessments of the improved below-grade building waterproofing systems discussed in Section III. Below-grade commercial waterproofing systems, as represented by state-of-the-art installations currently available in the market, are engineered to protect below-ground structures and their contents from the infiltration of ground water. These prior-art waterproofing systems, however, contain potential failure modes that arise through the system manufacturing and configuration, as well as through the installation process. The charts in FIGS. 15A and 15B are known as Pareto diagrams and show the relative levels of risk as defined by a process FMEA for below-grade waterproofing systems currently on the market and the improved below-grade waterproofing systems. The risk within the context of structural waterproofing systems is defined as having undetected latent defect(s) within a waterproofing-system installation that allow the infiltration of water and moisture into the protected structure, thereby causing damage to the structural contents or the structure itself, as well as negatively affecting the health of the building occupants.

The Pareto diagram in FIG. 15A depicts the risk inherent in below-grade waterproofing systems currently on the market, while the Pareto diagram in FIG. 15B depicts the much-reduced risk represented by the improved below-grade waterproofing systems. The identified risks were quantified in a process FMEA as disclosed in detail the aforementioned and incorporated-by-reference U.S. patent application Ser. No. 15/709,980. The relative difference in the risk level is the important factor to note here because for an FMEA, certain assumptions must be made with respect to the severity of a failure-mode occurrence, the frequency of a failure-mode occurrence, and whether the failure mode can be detected by the process. The absolute values of the FMEA RPNs (Risk Priority Numbers) may change (i.e., the frequency of occurrence is actually higher or lower). However, if the same assumptions were made for both the current system and the improved system, the relative difference between the two represents a quantitative reduction in the identified risk. In the process FMEA detailed in the aforementioned U.S. patent application Ser. No. 15/709,980, the sum of the initial RPN values (of all the RPN values of the individual failure modes along the independent axis of the Pareto diagrams) for the current systems was found to equal 418, while the sum of the final (mitigated) RPN values for the improved system was found to be equal to 79. The difference between the two represents an 81% reduction in the level of identified risk being carried in the waterproofing installations currently on the market, and this reduction was achieved by mitigating each of the identified risks by improving the installation process and apparatus by adding to or modifying the design of the waterproofing system, which in turn produced the improved below-grade waterproofing system disclosed in the present patent application. Furthermore, the improvements were successful in driving the RPN values of all the identified failure modes to below the orange 'Mitigate Risk' threshold. The below-grade waterproofing systems currently on the market have RPN values for most of the identified failure modes above the "Mitigate Risk" threshold, and two were shown to be above the "Unacceptable Risk" threshold. Note that the addition of vastly improved observability, and therefore reduced severity, in the form of an intrinsic leak-detection capability was the primary method for mitigating the identified risk to much lower levels.

V. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An improved waterproofing membrane for use in building construction, comprising:
   a polymer backing membrane substantially made from HDPE, said polymer backing membrane also having an electrically conductive layer, wherein either:
      said electrically-conductive layer is deposited on one surface by VMD consisting of a metallic coating and said metallic coating has an optical thickness of greater than or equal to 125 Angstroms and said metallic coating has a surface conductivity of less than or equal to 5 ohms/square, or
      said electrically-conductive layer comprised of a discrete metalized PET film or a thin metal foil and said discrete metalized PET film is adhesively bonded to said HDPE backing membrane, the thickness of said discrete metalized PET film is approximately 1 mil and said discrete metalized PET film's surface conductivity is less than or equal to 5 ohms/square; and
   comprising either:
      a rubberized-asphalt membrane laminated to said polymer backing membrane, or a sodium-bentonite-clay layer joined to said polymer backing membrane, wherein:
         said sodium-bentonite-clay layer either is laminated to the improved backing membrane or is disposed between layers of woven and/or non-woven geotextiles that are attached to said polymer backing membrane,
         the proximal surface of said sodium-bentonite-clay layer has a plurality of safe-to-fasten features stenciled or otherwise marked on an attached non-woven geotextile layer, said safe-to-fasten features adapted to facilitate attachment of said improved waterproofing membrane to building soldier posts and lagging members using penetrating mechanical fasteners for blindside installations, and
         the distal surface of said sodium-bentonite-clay layer has a plurality of safe-to-fasten features stenciled or otherwise marked on an attached non-woven geotextile layer, said safe-to-fasten features adapted to facilitate attachment of said improved waterproofing membrane to a building substrate using penetrating mechanical fasteners;
      whereby said improved waterproofing membrane has an intrinsic leak-detection capability that is readable by an external electronic readout device.

2. The improved waterproofing membrane of claim 1, wherein said electrically conductive layer has a plurality of openings to allow mechanical fasteners to pass through to facilitate attachment of said waterproofing membrane to a substrate.

3. The improved waterproofing membrane of claim 2, wherein said a plurality of safe-to-fasten features are aligned with said plurality of openings.

4. The improved waterproofing membrane of claim 1, wherein said improved waterproofing membrane is adapted for use in a stand-alone application.

5. The improved waterproofing membrane of claim 1, wherein said improved waterproofing membrane is adapted to be part of a composite waterproofing panel with an attached drainage board and a protected filter-layer.

6. The improved waterproofing membrane of claim 1, wherein electrically-conductive layer is electrically-partitioned in allow the exploitation of the CEC properties of sodium-bentonite clay in order to allow the moisture content of the sodium-bentonite clay to be determined and/or to all the hydrostatic loading on said sodium-bentonite clay to be inferred.

7. The improved waterproofing membrane of claim 1, further comprising film-based electronic pressure transducers to facilitate the direct measurement of hydrostatic loading on said sodium-bentonite clay.

8. The improved waterproofing membrane of claim 1, further comprising a fold-back feature on said polymer backing membrane that exposes a narrow strip of said electrically-conductive layer on the distal side of said HDPE backing membrane, wherein:
   said exposed electrically-conductive strip is strain-relieved at the foldback point, and
   said exposed electrically-conductive strip is protected by a distal-side release liner.

9. The improved waterproofing membrane of claim 8, further comprising a termination bar with electrical-contacting features to provide an electrical interface to:
   said exposed electrically-conductive strip; and/or
   to said one or more improved waterproofing membranes that are part of a below-grade installation; and/or
   an external electronic-readout device; and/or
   that would be installed within the termination bar; and/or
   the structural earth ground to provide a return path for electrical-displacement current used for leak-detection measurements.

10. The improved waterproofing membrane of claim 9, further comprising an external electronic-readout device in electrical communication with said termination bar.

11. The improved waterproofing membrane of claim 1, wherein:
   the proximal surface of said improved waterproofing membrane is augmented with a conductive or partially conductive material in order to enhance the performance of a capacitive-coupling installation-verification method; and
   said partially conductive layer is a carbon-laced film layer that has a surface conductivity of less than or equal to 1000 ohms/square or said conductive layer is comprised of a metalized-polymer mesh with an average surface conductivity of less than or equal to 5 ohms/square;
   whereby said enhanced conductive layer facilitates intrinsic leak-detection capabilities for above-grade air-barrier applications where the installation site has a non-conductive installation surface.

12. The improved waterproofing membrane of claim 1, wherein:
   the proximal surface of said improved waterproofing membrane is augmented with an auxiliary detection grid; and
   said auxiliary detection grid is comprised of two sets of grid elements made from a masked metalized polymer membrane or said auxiliary detection grid is printed from conductive ink;

whereby said auxiliary detection grid facilitates the detection of the presence of water or moisture between said improved waterproofing membrane and a building surface that said improved waterproofing membrane is installed on.

13. The improved waterproofing membrane of claim 1, wherein said polymer backing membrane is laminated to said rubberized-asphalt membrane, and said improved waterproofing membrane is adapted to provide intrinsic leak-detection capabilities for above-grade deck coatings and built-up and modified roofing applications.

14. An improved polymer backing membrane for use in building waterproofing systems, comprising:
a backing membrane substantially made from HDPE, said backing membrane also having an electrically conductive layer, wherein either:
said electrically-conductive layer is deposited on one surface by VMD consisting of a metallic coating and said metallic coating has an optical thickness of greater than or equal to 125 Angstroms and said metallic coating has a surface conductivity of less than or equal to 5 ohms/square, or
said electrically-conductive layer comprised of a discrete metalized PET film or a thin metal foil and said discrete metalized PET film is adhesively bonded to said HDPE backing membrane, the thickness of said discrete metalized PET film is approximately 1 mil and said discrete metalized PET film's surface conductivity is less than or equal to 5 ohms/square;
whereby said improved polymer backing membrane has an intrinsic leak-detection capability that is readable by an external electronic readout device.

15. The improved polymer backing membrane of claim 14, wherein said electrically conductive layer has a plurality of openings to allow mechanical fasteners to pass through to facilitate attachment of said waterproofing membrane to a substrate.

16. The improved polymer backing membrane of claim 14, wherein said improved polymer backing membrane is adapted for use as a stand-alone membrane to provide intrinsic leak-detection capabilities for above-grade deck coatings and roofing applications.

17. An improved single-ply roofing system, said roofing system having one or more roofing membranes, comprising:
at least one improved polymer backing membrane according to claim 14, wherein:
said improved polymer backing membrane is adapted for use as a stand-alone membrane to provide intrinsic leak-detection capabilities for single-ply roofing applications across the life-cycle of a roof,
said underlying polymer backing membrane is adapted to be located above and aligned transversely with the single-ply roofing membrane,
said electrical-leak detection comprises wireless transceivers and are disposed at approximately the center of the longitudinal axis of said one or more roofing membranes in order to minimize exposure to heat during installation of said improved roofing system, and
said wireless transceivers are attached via electrically conductive adhesive;
an electrically-conductive or partially electrically-conductive underlayment layer, adapted to be disposed against a roofing structural substrate to provide an earth-ground in order to provide a return path for the electrical-displacement current used for leak-detection measurements.

18. The improved single-ply roofing system of claim 17, wherein said electrically-conductive or partially electrically-conductive underlayment layer is a carbon-laced film with a surface conductivity of less than or equal to 1000 ohms/square.

19. The improved single-ply roofing system of claim 17, wherein said electrically-conductive or partially electrically-conductive underlayment layer is a metalized polymer mesh with an average surface conductivity of less than or equal to 15 ohms/square.

20. The improved single-ply roofing system of claim 17, wherein said at least one improved polymer backing membrane is adapted to provide a layered leak-detection capability from the outer roofing layer all the way down to the roofing substrate.

21. An improved deck-coating system, comprising:
at least one improved polymer backing membrane according to claim 14, wherein:
said improved polymer backing membrane is adapted for use as a stand-alone membrane to provide intrinsic leak-detection capabilities across the life-cycle of a deck,
said electrical-leak detection comprises wireless transceivers and are disposed at approximately the center of the longitudinal axis of said one or more deck membranes in order to minimize exposure to heat during installation of said improved deck-coating system, and
said wireless transceivers are attached via electrically conductive adhesive;
an electrically-conductive or partially electrically-conductive underlayment layer, adapted to be disposed against a decking structural substrate to provide an earth-ground in order to provide a return path for the electrical-displacement current used for leak-detection measurements.

* * * * *